United States Patent
Takahashi et al.

(10) Patent No.: US 9,800,061 B2
(45) Date of Patent: Oct. 24, 2017

(54) POWER TRANSMITTING APPARATUS, POWER RECEIVING APPARATUS, CONTROL METHODS THEREOF, AND PROGRAM

(71) Applicant: CANON KABUSHIKI KAISHA, Tokyo (JP)

(72) Inventors: Naoto Takahashi, Saitama (JP); Tadashi Eguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 239 days.

(21) Appl. No.: 14/770,773

(22) PCT Filed: Mar. 28, 2014

(86) PCT No.: PCT/JP2014/059908
§ 371 (c)(1),
(2) Date: Aug. 26, 2015

(87) PCT Pub. No.: WO2014/171349
PCT Pub. Date: Oct. 23, 2014

(65) Prior Publication Data
US 2016/0087448 A1   Mar. 24, 2016

(30) Foreign Application Priority Data

Apr. 19, 2013 (JP) .................... 2013-088878
Apr. 19, 2013 (JP) .................... 2013-088879
Apr. 19, 2013 (JP) .................... 2013-088881

(51) Int. Cl.
*H02J 5/00* (2016.01)
*H02J 7/02* (2016.01)
*H02J 7/00* (2006.01)

(52) U.S. Cl.
CPC .............. *H02J 5/005* (2013.01); *H02J 7/025* (2013.01); *H02J 2007/0001* (2013.01)

(58) Field of Classification Search
CPC combination set(s) only.
See application file for complete search history.

(56) References Cited

U.S. PATENT DOCUMENTS 5,235,406 A   8/1993   Ishii et al.
5,528,227 A   6/1996   Eguchi
(Continued)

FOREIGN PATENT DOCUMENTS

EP    2079144 A2    7/2009
JP    2009-106126 A    5/2009
(Continued)

OTHER PUBLICATIONS

Soljacic, Marin, et al. "Wireless Technology Developed to Transmit Power Lights up a 60W Bulb in Tests", Nikkei Electronics, vol. 966, Dec. 3, 2007, pp. 117 to 129.
(Continued)

*Primary Examiner* — An Luu
(74) *Attorney, Agent, or Firm* — Fitzpatrick, Cella, Harper & Scinto

(57) ABSTRACT

A power transmitting apparatus that transmits power to a power receiving apparatus executes intermittent wireless transmission of power. The power transmitting apparatus operates according to one of a first power transmitting method including detecting a signal load-modulated by the power receiving apparatus using an ID in response to the transmitted power during the intermittent transmission and a second power transmitting method including transmitting the power having modulated the power according to an ID determined in advance so that the power receiving apparatus detects the ID determined in advance.

24 Claims, 18 Drawing Sheets

(56) References Cited

U.S. PATENT DOCUMENTS

| | | | |
|---|---|---|---|
| 5,539,687 | A | 7/1996 | Torisawa et al. |
| 5,708,402 | A | 1/1998 | Hachisu et al. |
| 5,760,525 | A | 6/1998 | Hachisu et al. |
| 5,815,055 | A | 9/1998 | Eguchi et al. |
| 5,917,850 | A | 6/1999 | Fujita et al. |
| 6,020,672 | A | 2/2000 | Yokota et al. |
| 7,920,545 | B2 | 4/2011 | Eguchi |
| 8,155,047 | B2 | 4/2012 | Eguchi |
| 8,577,479 | B2* | 11/2013 | Wakamatsu ............ H02J 5/005 307/32 |
| 8,615,192 | B2 | 12/2013 | Eguchi |
| 8,626,074 | B2 | 1/2014 | Eguchi |
| 8,811,364 | B2 | 8/2014 | Eguchi |
| 9,278,454 | B2 | 3/2016 | Mimura et al. |
| 9,660,478 | B2* | 5/2017 | Von Novak ............ H02J 7/025 |
| 2011/0025265 | A1 | 2/2011 | Mochida et al. |
| 2011/0140538 | A1 | 6/2011 | Jung et al. |
| 2012/0205988 | A1 | 8/2012 | Tanabe |
| 2012/0326524 | A1 | 12/2012 | Matsumoto et al. |
| 2013/0127255 | A1 | 5/2013 | Tsujimoto |
| 2014/0103871 | A1 | 4/2014 | Maikawa et al. |
| 2016/0087450 | A1 | 3/2016 | Takahashi |
| 2016/0094050 | A1 | 3/2016 | Shichino et al. |
| 2016/0118811 | A1 | 4/2016 | Eguchi |

FOREIGN PATENT DOCUMENTS

| | | |
|---|---|---|
| JP | 2009-189230 A | 8/2009 |
| JP | 2009-205050 A | 9/2009 |
| JP | 2010-051137 A | 3/2010 |
| JP | 2010-088143 A | 4/2010 |
| JP | 2011-152008 A | 8/2011 |
| JP | 2011-211866 A | 10/2011 |
| JP | 2011-229265 A | 11/2011 |
| JP | 2012-016171 A | 1/2012 |
| JP | 2012-060721 A | 3/2012 |
| JP | 2012-170194 A | 9/2012 |
| JP | 2012-249400 A | 12/2012 |
| JP | 2012-249407 A | 12/2012 |
| JP | 2013-027074 A | 2/2013 |
| JP | 2013-038924 A | 2/2013 |
| WO | 2012-165242 A1 | 12/2012 |

OTHER PUBLICATIONS

Japanese Office Action dated Dec. 16, 2016 in Japanese Application No. 2013088879.

Japanese Office Action dated Jan. 13, 2017, corresponding to Japanese Application No. 2013-088881.

Japanese Office Action dated Dec. 19, 2016, corresponding to Japanese Application No. 2013-088878.

* cited by examiner

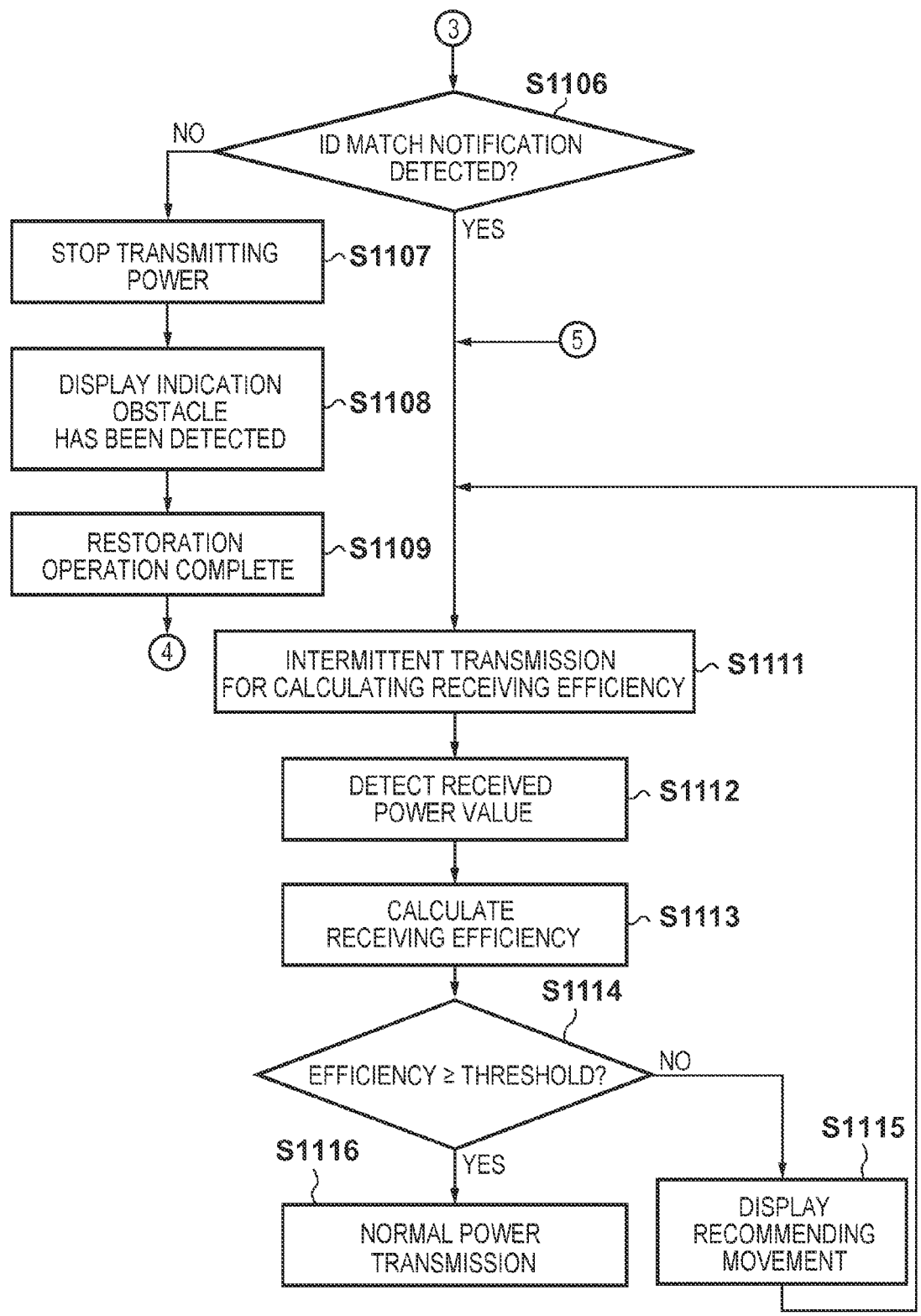

POWER TRANSMITTING APPARATUS, POWER RECEIVING APPARATUS, CONTROL METHODS THEREOF, AND PROGRAM

TECHNICAL FIELD

The present invention relates to power transmitting apparatuses, power receiving apparatuses, control methods thereof, and programs.

BACKGROUND ART

Widespread research and development of wireless power transmission techniques has been underway since Massachusetts Institute of Technology (MIT) successfully demonstrated wireless power transmission using magnetic resonance in 2007. Wireless power transmission is also garnering attention as a technique that, when combined with wireless communication, enables the realization of a completely wireless system ("Wireless technology developed to transmit power, lights up a 60 W bulb in tests", Nikkei Electronics, Vol. 966, Dec. 3, 2007). Furthermore, these days, wireless power transmission techniques continue to spread in a variety of applications, such as charging electric automobiles and hybrid automobiles, charging small electronic devices such as smartphones, and so on. For example, Japanese Patent Laid-Open No. 2013-38924 discloses a power transmission management apparatus that transmits power to a vehicle.

With regard to the safe operation of a wireless power transmitting system, it is necessary to take into consideration objects that may be present in a power transmission-capable area, particularly in systems that can transmit power even when a power transmitting apparatus and a power receiving apparatus are distanced from each other, such as magnetic resonance-based systems. In other words, it is necessary to ensure to the greatest extent possible that power will not be transmitted to obstacles that are not power transmission targets, other unauthenticated devices, and so on located within the power transmission-capable area of the power transmitting apparatus. Furthermore, it is necessary to suppress heat and the like emitted due to a drop in efficiency by ensuring that the power transmitting apparatus transmits power only when the power receiving apparatus is present in an appropriate location in a relative positional relationship with the power transmitting apparatus.

Japanese Patent Laid-Open No. 2013-38924 discloses a method in which authentication is carried out between the power transmitting apparatus and the power receiving apparatus before the power transmitting apparatus transmits power, and power transmission is continued after checking the consistency between a power amount supplied by the power transmitting apparatus and a power amount received by a vehicle. However, when using this method, a large amount of power is transmitted and received immediately after the authentication between the power transmitting apparatus and the power receiving apparatus has ended. Accordingly, there is a problem in that the power transmitting apparatus begins transmitting power even in the case where the power transmitting apparatus and the power receiving apparatus are not in an appropriate positional relationship, resulting in a drop in the transmission efficiency.

The present invention enables wireless power transmission based on the positional relationship between a power transmitting apparatus and a power receiving apparatus.

SUMMARY OF INVENTION

According to one aspect of the present invention, there is provided power transmitting apparatus that transmits power to a power receiving apparatus, the power transmitting apparatus comprising: intermittent power transmission means that executes intermittent wireless transmission of power; detection means that detects a load-modulated signal received from the power receiving apparatus in response to the power transmitted by the intermittent power transmission means; and extension means that extends a transmission period of the intermittent power transmission means in the case where the load-modulated signal has been detected by the detection means.

According to second aspect of the present invention, there is provided a power receiving apparatus that receives power from a power transmitting apparatus, the power receiving apparatus comprising: modulation means that repeats load modulation using a signal containing an ID determined in advance, wherein the load modulation is repeated by the modulation means until power transmitted intermittently from the power transmitting apparatus exceeds a predetermined value.

According to third aspect of the present invention, there is provided a power receiving apparatus that receives power from a power transmitting apparatus, the power receiving apparatus comprising: notification means that notifies the power transmitting apparatus of an ID determined in advance through load modulation, wherein the notification is repeated by the notification means until a notification indicating that the ID has been received is received from the power transmitting apparatus.

According to fourth aspect of the present invention, there is provided a power transmission system comprising a power transmitting apparatus and a power receiving apparatus, wherein the power transmitting apparatus includes: intermittent power transmission means that executes intermittent wireless transmission of power; detection means that detects a load-modulated signal received from the power receiving apparatus in response to the power transmitted by the intermittent power transmission means; and extension means that extends a transmission period of the intermittent power transmission means in the case where the load-modulated signal has been detected by the detection means, wherein the power receiving apparatus includes: modulation means that repeats load modulation using a signal containing an ID determined in advance, and wherein the load modulation is repeated by the modulation means until power transmitted intermittently from the power transmitting apparatus exceeds a predetermined value.

According to fifth aspect of the present invention, there is provided a control method for a power transmitting apparatus that transmits power to a power receiving apparatus, the method comprising the steps of: executing intermittent wireless transmission of power; detecting a load-modulated signal received from the power receiving apparatus in response to the power transmitted in the step of intermittent wireless transmission of power; and extending a transmission period of the intermittent wireless transmission of power in the case where the load-modulated signal has been detected in the step of detecting.

According to sixth aspect of the present invention, there is provided a control method for a power receiving apparatus that receives power from a power transmitting apparatus, the method comprising a step of: repeating load modulation using a signal containing an ID determined in advance, wherein the load modulation is repeated in the step of repeating load modulation until power transmitted intermittently from the power transmitting apparatus exceeds a predetermined value.

According to seventh aspect of the present invention, there is provided a power transmitting apparatus that transmits power to a power receiving apparatus, the power transmitting apparatus comprising: first power transmitting means that executes wireless power transmission, wherein the first power transmitting means executes the power transmission by modulating power according to an ID determined in advance so that the power receiving apparatus detects the ID determined in advance.

According to eighth aspect of the present invention, there is provided a power receiving apparatus that receives power from a power transmitting apparatus, the power receiving apparatus comprising: power receiving means that receives power wirelessly from the power transmitting apparatus; determination means that determines whether or not an ID detected based on a state of modulation of a power signal received by the power receiving means matches an ID determined in advance with the power transmitting apparatus; and notification means that provides an ID match notification to the power transmitting apparatus in the case where the determination means has determined that the IDs match.

According to ninth aspect of the present invention, there is provided a power transmission system comprising a power transmitting apparatus and a power receiving apparatus, wherein the power transmitting apparatus includes: power transmitting means that executes wireless power transmission, the power transmitting means executing the power transmission by modulating power according to an ID determined in advance so that the power receiving apparatus detects the ID determined in advance, and wherein the power receiving apparatus includes: power receiving means that receives an intermittent power signal wirelessly from the power transmitting apparatus; determination means that determines whether or not an ID detected based on a state of the power received by the power receiving means matches an ID determined in advance with the power transmitting apparatus; and notification means that provides an ID match notification to the power transmitting apparatus in the case where the determination means has determined that the IDs match.

According to tenth aspect of the present invention, there is provided a control method for a power transmitting apparatus that transmits power to a power receiving apparatus, the method comprising a step of: executing wireless power transmission, wherein in the step of executing wireless power transmission, the power transmission is executed by modulating power according to an ID determined in advance so that the power receiving apparatus detects the ID determined in advance.

According to eleventh aspect of the present invention, there is provided a control method for a power receiving apparatus that receives power from a power transmitting apparatus, the method comprising the steps of: receiving power wirelessly from the power transmitting apparatus; determining whether or not an ID detected based on a state of the power received in the step of receiving matches an ID determined in advance with the power transmitting apparatus; and providing an ID match notification to the power transmitting apparatus in the case where it has been determined in the step of determining that the IDs match.

According to twelfth aspect of the present invention, there is provided a power transmitting apparatus that transmits power to a power receiving apparatus, the power transmitting apparatus comprising: intermittent power transmission means that executes intermittent wireless transmission of power; and selection means that selects one of a first power transmitting method including detecting a signal load-modulated by the power receiving apparatus using an ID in response to the transmitted power during the intermittent transmission and a second power transmitting method including transmitting the power having modulated the power according to an ID determined in advance so that the power receiving apparatus detects the ID determined in advance, wherein the power transmitting apparatus operates according to the power transmitting method selected by the selection means.

According to thirteenth aspect of the present invention, there is provided a control method for a power transmitting apparatus that transmits power to a power receiving apparatus, the method comprising the steps of: executing intermittent wireless transmission of power; and selecting one of a first power transmitting method including detecting a signal load-modulated by the power receiving apparatus using an ID in response to the transmitted power during the intermittent transmission and a second power transmitting method including transmitting the power having modulated the power according to an ID determined in advance so that the power receiving apparatus detects the ID determined in advance, wherein the power transmitting apparatus operates according to the power transmitting method selected in the step of selecting.

The present invention enables wireless power transmission based on the positional relationship between a power transmitting apparatus and a power receiving apparatus.

Further features of the present invention will become apparent from the following description of exemplary embodiments (with reference to the attached drawings).

BRIEF DESCRIPTION OF DRAWINGS

FIGS. 11A to 11B are flowcharts illustrating operations performed by the power transmitting apparatus according to the second embodiment.

DESCRIPTION OF EMBODIMENTS

Figure 1:
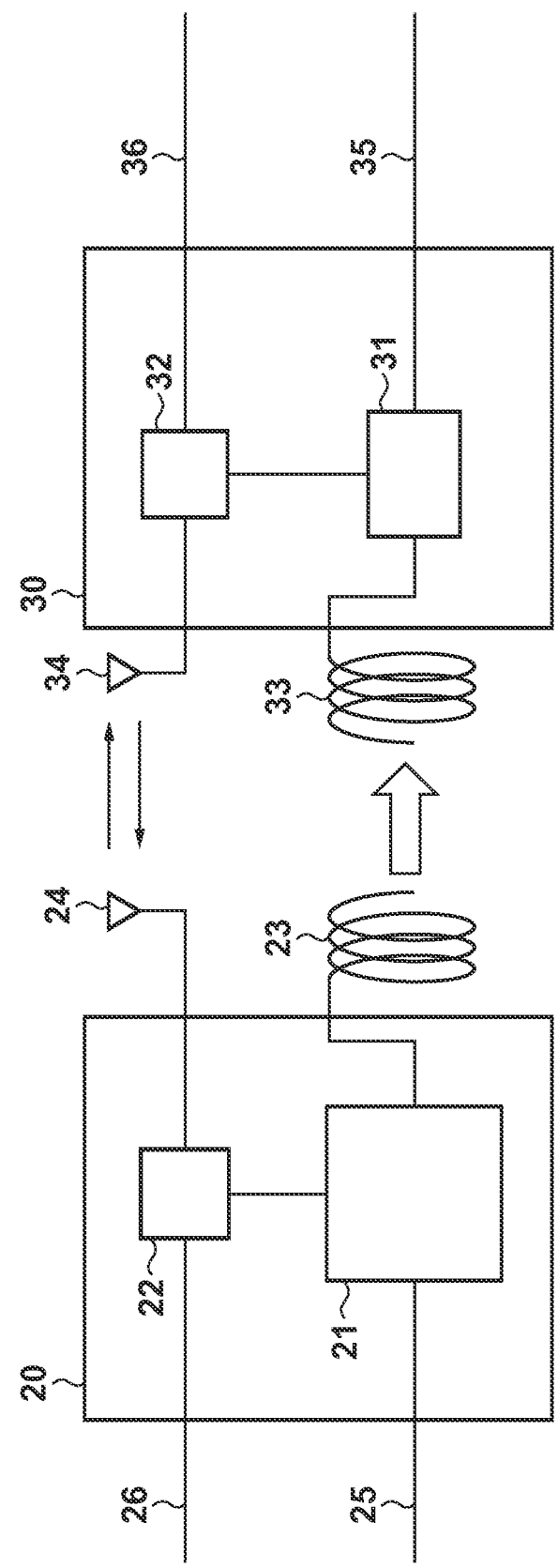
FIG. 1 is a diagram illustrating a wireless power transmitting system according to a first embodiment.

Hereinafter, the present invention will be described in detail with reference to the appended drawings. It should be noted that the configurations described in the following embodiments are merely examples, and that the present invention is not intended to be limited to the configurations described therein and illustrated in the drawings.

First Embodiment

The present embodiment will be described with reference to the drawings. FIG. 1 is a diagram illustrating a wireless power transmitting system according to the present embodiment. The wireless power transmitting system according to the present embodiment includes a power transmitting apparatus 20 and a power receiving apparatus 30. The power transmitting apparatus 20 and the power receiving apparatus 30 include a communication unit 22 and a communication unit 32, respectively, that communicate wirelessly using Bluetooth®, for example. The communication unit 22 and the communication unit 32 communicate wirelessly via an antenna 24 and an antenna 34, respectively, by converting digital signals transmitted via a communication line 26 and a communication line 36, respectively. A power transmitting section 21 in the power transmitting apparatus 20 converts a DC or AC power input from a power transmission line 25 into AC frequency power in a transmission band, and transmits the power via an antenna 23. A power receiving section 31 in the power receiving apparatus 30 converts the AC power received via an antenna 33 into DC power or AC power in a desired frequency, and outputs the power to a power transmission line 35.

Power is transmitted over a long distance when transmitting power using a resonance phenomenon, microwaves, or the like, and thus it is necessary to pair power transmitting apparatuses with power receiving apparatuses and transmit power to a desired apparatus while preventing power from being transmitted to other apparatuses and objects. In the present embodiment, the power receiving apparatus 30 first searches out the power transmitting apparatus 20 via the communication unit 32, after which authentication is carried out between the communication unit 32 and the communication unit 22. Specifically, in the authentication, IDs are exchanged between the communication unit 32 of the power receiving apparatus 30 and the communication unit 22 of the power transmitting apparatus 20.

Figure 2:
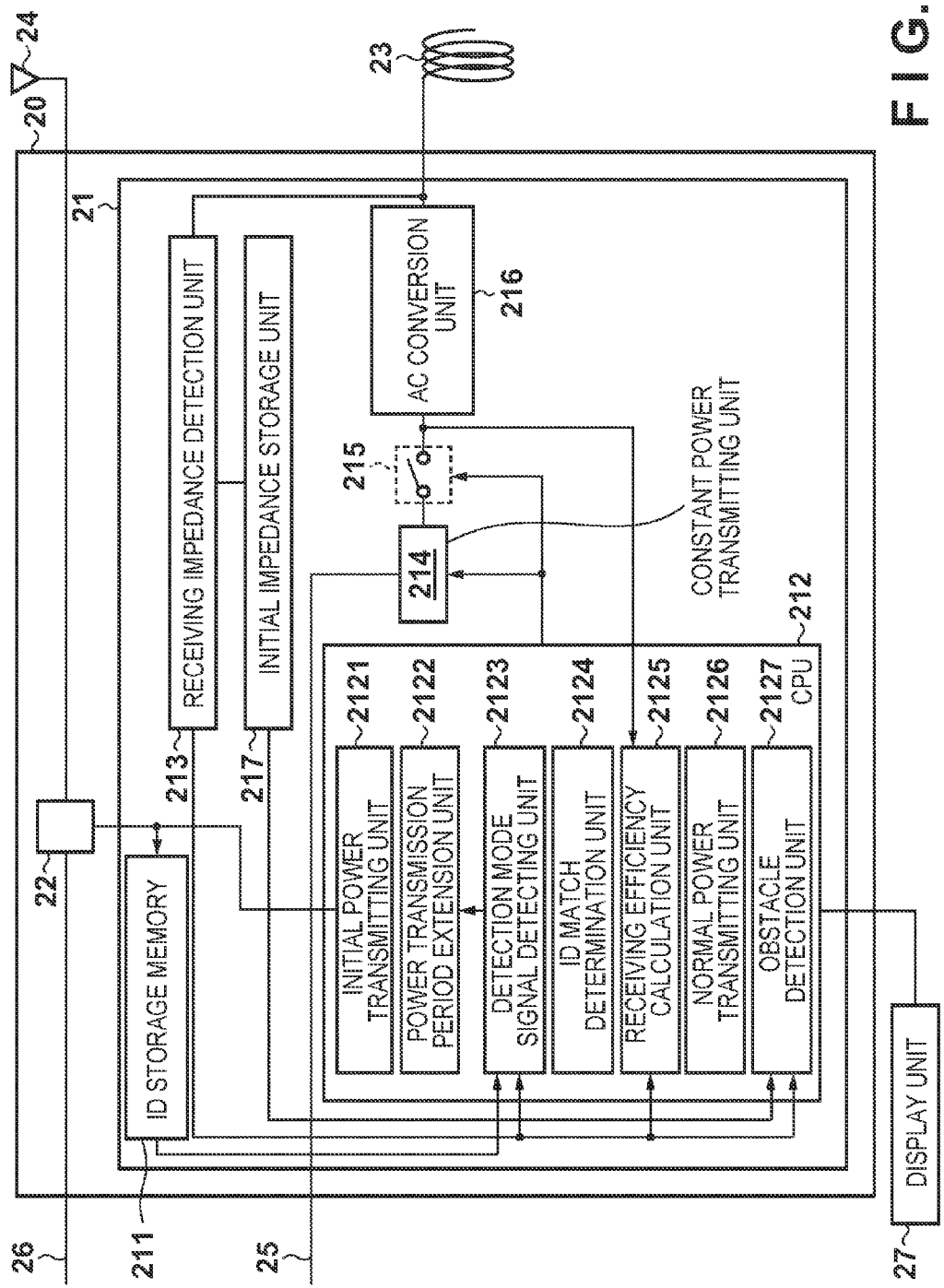
FIG. 2 is a diagram illustrating the configuration of a power transmitting section in a power transmitting apparatus according to some embodiments.

FIG. 2 is a block diagram illustrating in detail an example of the internal configuration of the power transmitting section 21 of the power transmitting apparatus 20. A CPU 212 includes an initial power transmitting unit 2121, a power transmission period extension unit 2122, a detection mode signal detecting unit 2123, an ID match determination unit 2124, a receiving efficiency calculation unit 2125, a normal power transmitting unit 2126, and an obstacle detection unit 2127. The functions of the respective units in the CPU 212 will be described later. A display unit 27 displays information input to the CPU 212 from the respective units. A constant power transmitting unit 214 is a constant voltage source, and a power required to receive power, a power required for an initial power transmission sequence (called an "initial sequence" hereinafter), and the like are set by the initial power transmitting unit 2121 of the CPU 212. The initial power transmitting unit 2121 may further transmit the initial power in cyclical intermittent transmission. A switch 215 is used when performing cyclical intermittent transmission of the initial power in the initial sequence. The switch 215 may be used to send basic data to the power receiving apparatus 30 by turning the switch 215 on and off. Although the switch 215 is disposed between the constant power transmitting unit 214 and an AC conversion unit 216 in FIG. 2, any position may be used as long as the output power can be turned on and off, and thus the switch 215 may be disposed before the constant power transmitting unit 214, after the AC conversion unit 216, and so on. Furthermore, the AC power output may be turned on and off by turning a driving signal for a switching element (not shown) within the AC conversion unit 216 on and off, instead of providing the switch 215. The AC conversion unit 216 converts DC power or AC power from an AC outlet or the like into a frequency for power transmission.

A receiving impedance detection unit 213 detects load modulation carried out in the power receiving apparatus 30 as well as impedance changes in the antenna 33, other parts of the power receiving section 31, and so on. The receiving impedance detection unit 213 generally detects the receiving impedance by detecting reflections caused by mismatches between an impedance on the power transmitting apparatus 20 side, including the transmission antenna 23, and an impedance on the power receiving apparatus 30 side. Generally, the efficiency of coupling between power transmitting and receiving changes as the positional relationship of the power transmitting and receiving apparatuses changes, and thus reflections caused by mismatches will change even if the receiving impedance of the power receiving apparatus 30 remains the same. However, in the case where a set value such as a unique word is used in the load modulation performed by the power receiving apparatus 30, the receiving impedance detection unit 213 can distinguish between a change in the receiving impedance and positional variation. The receiving impedance detection unit 213 can also detect objects in a predetermined area around the power transmitting apparatus 20 based on changes in the impedance on the power transmitting apparatus 20 side, including the transmission antenna 23.

An initial impedance storage unit 217 stores an initial impedance occurring when there is nothing in the periphery of the power transmitting apparatus 20. When, during initial power transmission, the receiving impedance detection unit 213 detects an impedance that differs from the initial impedance without load modulation from the power receiving apparatus 30, the obstacle detection unit 2127 stops the initial power transmission by controlling the switch 215. The obstacle detection unit 2127 then displays an indication that an obstacle has been detected in the display unit 27. An ID storage memory 211 stores an ID determined through the device authentication performed by the communication unit 22. Meanwhile, the ID match determination unit 2124 examines whether or not an ID contained in a detection mode signal detected by the detection mode signal detecting unit 2123 matches an ID stored in the ID storage memory 211, and sends an ID match notification in the case where the IDs match.

After the ID match notification has been sent, the power transmitting apparatus 20 performs intermittent transmission for calculating the receiving efficiency. Upon receiving the intermittent transmission for calculating the receiving efficiency, the power receiving apparatus 30 load-modulates the received power amount or sends the received power amount to the power transmitting apparatus 20 via the communication unit 32. Upon detecting the power amount received by the power receiving apparatus 30 from the receiving impedance detection unit 213 or from the communication unit 22, the receiving efficiency calculation unit 2125 of the CPU 212 calculates the receiving efficiency by comparing the received power amount with the transmitted power. In the case where the receiving efficiency is lower than a predetermined threshold, the receiving efficiency calculation unit 2125 displays an indication that the receiving efficiency is poor in the display unit 27, and prompts the power receiving apparatus 30 to be moved to an appropriate position. On the other hand, in the case where the receiving efficiency calculation unit 2125 determines that the receiving efficiency exceeds the threshold, the normal power transmitting unit 2126 starts normal power transmission.

It is desirable for the power transmission in the initial sequence to be intermittent transmission so that even in the case where power has been transmitted to an obstacle, a heat dissipation period is provided for the obstacle in order to suppress a steady rise in temperature caused by continuous power transmission. However, power can be transmitted continuously in the initial sequence in the case where a sufficiently small amount of power is transmitted in the initial sequence and an obstacle is detected for a sufficiently short amount of time in the initial sequence.

Figure 3:
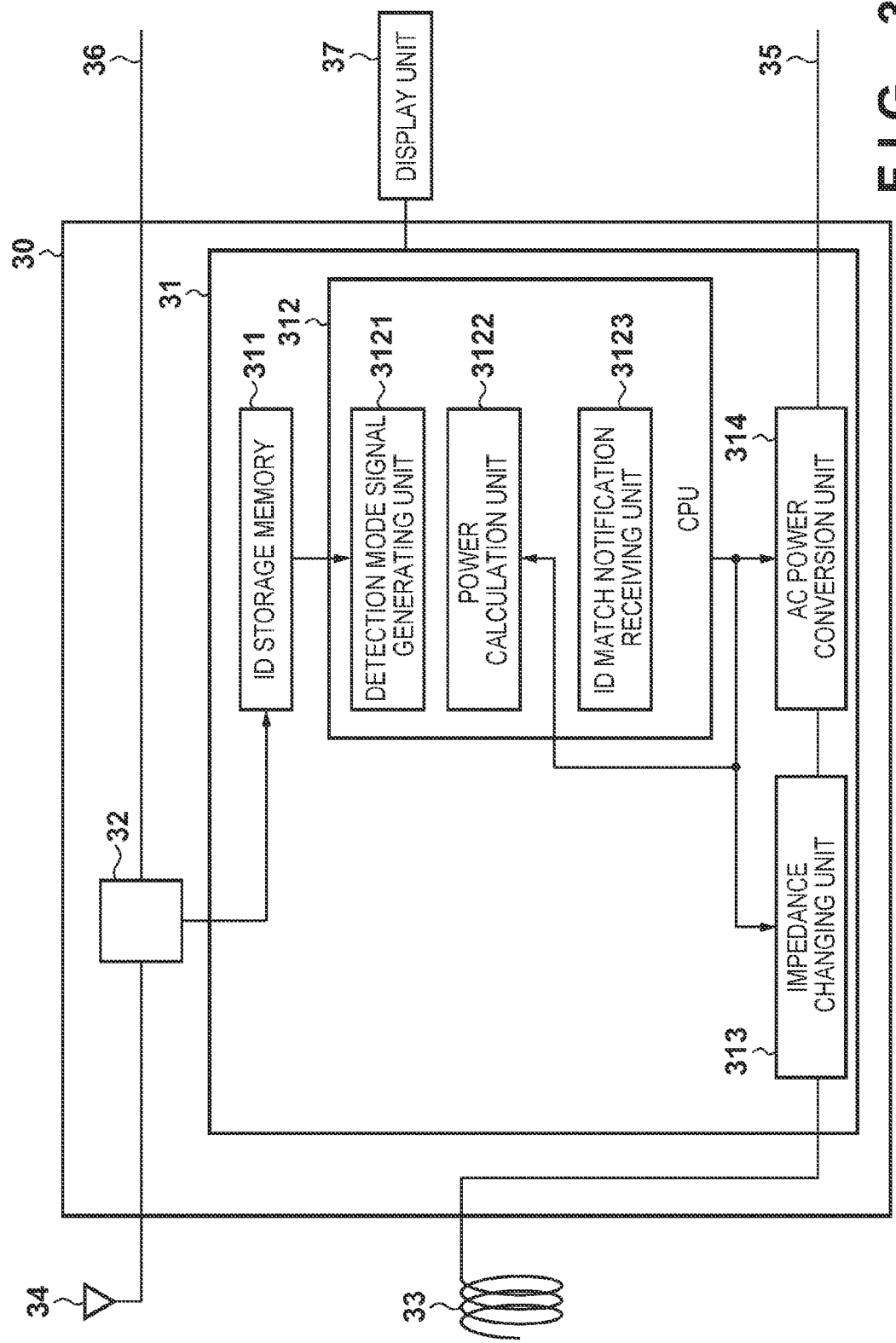
FIG. 3 is a diagram illustrating the configuration of a power receiving section in a power receiving apparatus according to a first embodiment.

FIG. 3 is a block diagram illustrating in detail an example of the internal configuration of the power receiving section 31 of the power receiving apparatus 30 shown in FIG. 1. A CPU 312 includes a detection mode signal generating unit 3121, a power calculation unit 3122, and an ID match notification receiving unit 3123. The functions of the respective units in the CPU 312 will be described later. A display unit 37 displays information input to the CPU 312 from the respective units. 314 in the power receiving section 31 indicates an AC power conversion unit, including a rectifier circuit, a constant voltage source, and so on. An impedance changing unit 313 adjusts the alignment of the receiving antenna 33, and furthermore carries out load modulation using the detection mode signal. As long as the authentication by the communication unit 32 has not ended, the impedance changing unit 313 sets the impedance on the circuit side relative to the receiving antenna 33 to a high impedance. The detection mode signal generating unit 3121 of the CPU 312 reads out an ID from an ID storage memory 311 that stores the ID determined through the authentication performed by the communication unit 32, and generates the detection mode signal. The impedance changing unit 313 carries out load modulation using the generated detection mode signal.

Figure 4:
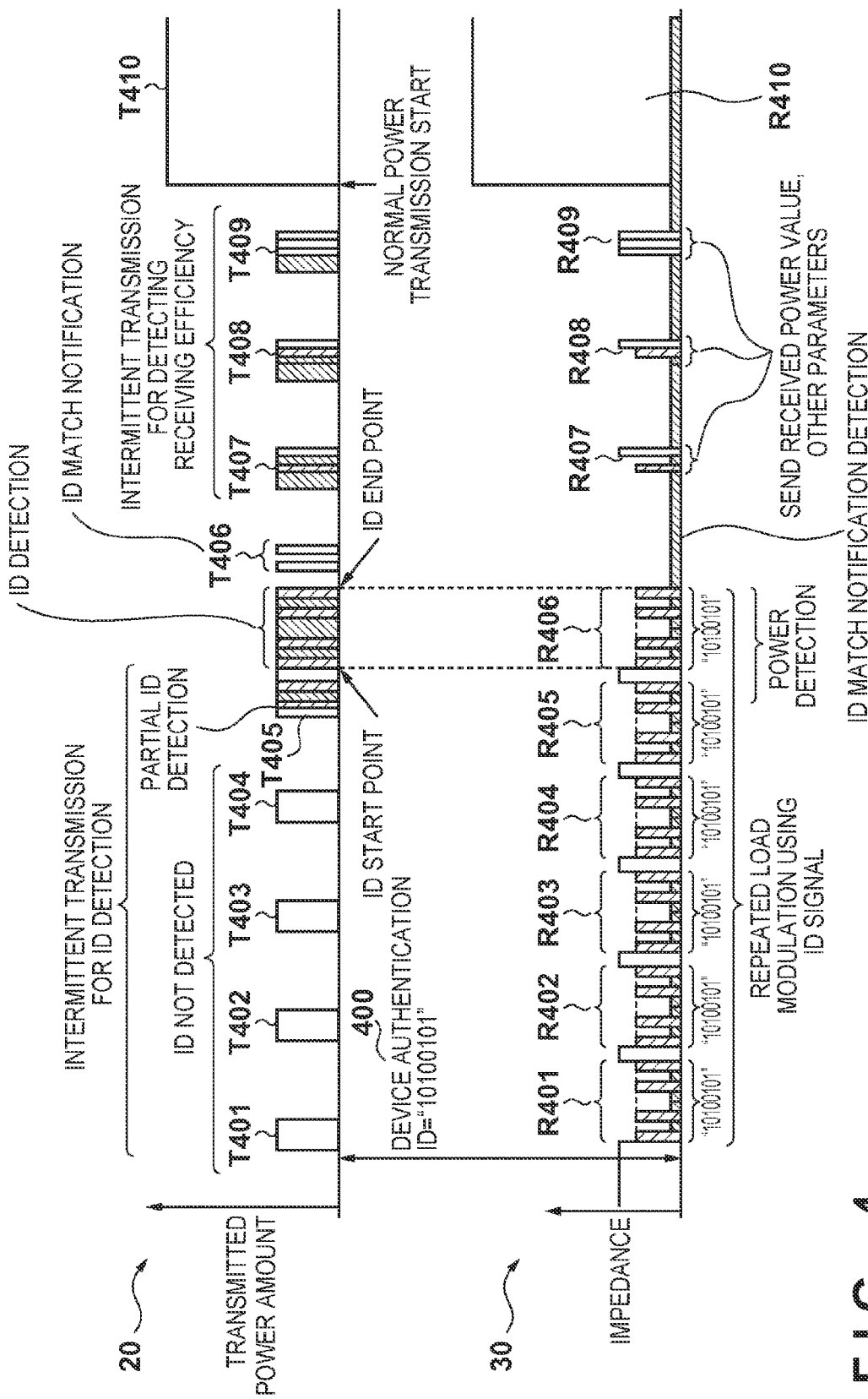
FIG. 4 is a timing chart of the wireless power transmitting system according to the first embodiment.
Figure 7:
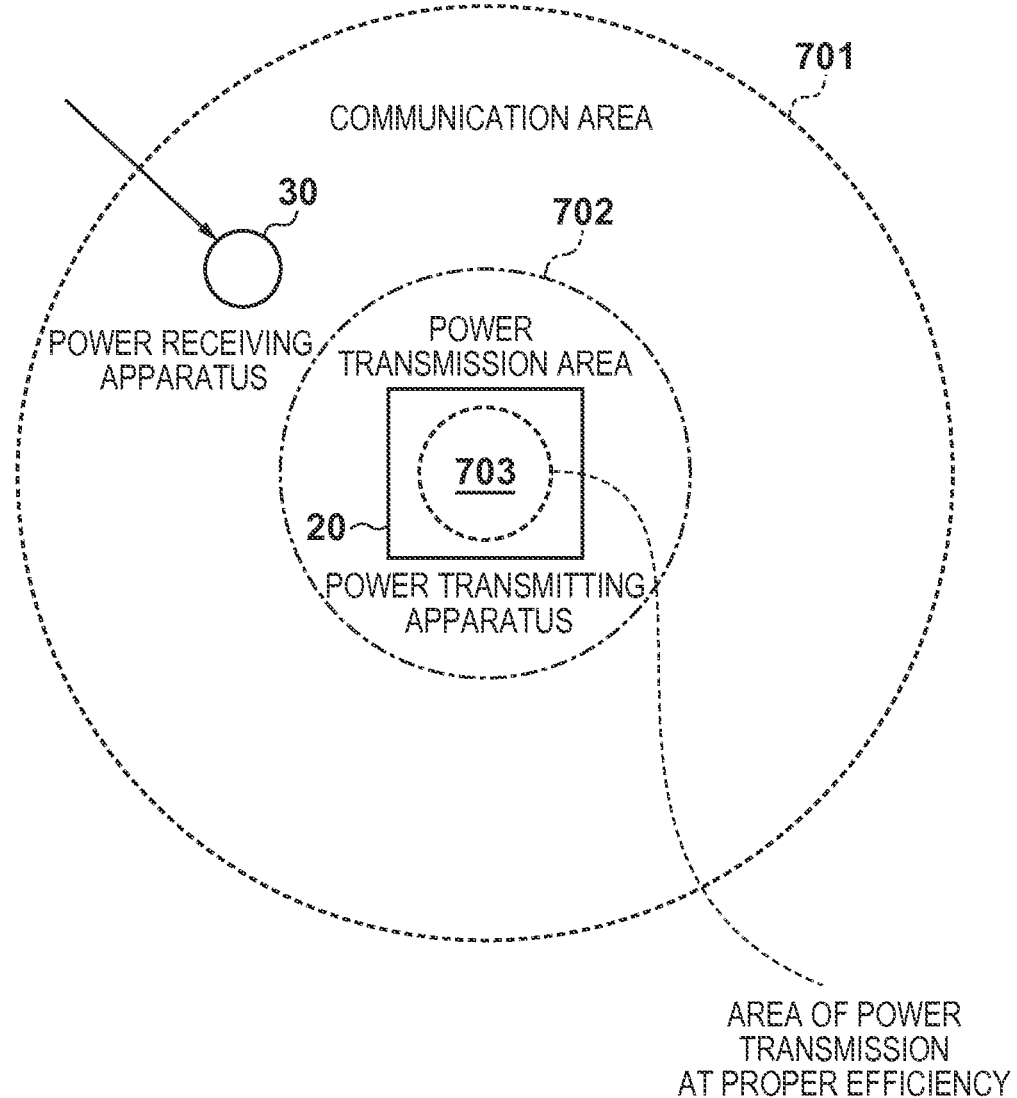
FIG. 7 is a diagram illustrating an appropriate positional relationship between the power transmitting apparatus and the power receiving apparatus.

Next, operations performed in the initial sequence between the power transmitting apparatus 20 and the power receiving apparatus 30 will be described with reference to FIG. 4. FIG. 4 is a timing chart for the power transmitting apparatus 20 and the power receiving apparatus 30. In FIG. 4, the vertical axis for the power transmitting apparatus 20 schematically indicates an amount of power transmitted, and the vertical axis for the power receiving apparatus 30 schematically indicates the receiving impedance. The following descriptions assume an environment in which the power receiving apparatus 30 approaches the power transmitting apparatus 20 in order to receive power, as shown in FIG. 7. FIG. 7 indicates a communication area 701, a power transmission area 702, and an area 703 in which power transmission can be carried out at a proper efficiency, when the power receiving apparatus 30 approaches the power transmitting apparatus 20.

When the power receiving apparatus 30 enters the communication area 701 of the power transmitting apparatus 20 shown in FIG. 7, the power receiving apparatus 30 begins device authentication with the power transmitting apparatus 20. The power transmitting apparatus 20 and the power receiving apparatus 30 exchange IDs in the device authentication. When device authentication 400 ends, the power transmitting apparatus 20 starts initial power transmission for ID detection at a constant cycle. In the present embodiment, the initial power is transmitted intermittently (T401 to T405). At this time, the initial power transmitting unit 2121 of the CPU 212 sets the minimum necessary power value for the initial sequence leading up to normal power transmission (until ID detection, confirmation of receiving efficiency, and so on in the frequency band of the power receiving apparatus have ended) in the constant power transmitting unit 214. Specifically, the initial power transmitting unit 2121 sets the load modulation of the power receiving apparatus 30 to a power that can be detected by the power transmitting apparatus 20 in an area that includes the area 703 in which power transmission can be carried out at a proper efficiency.

The power receiving apparatus 30 repeatedly performs load modulation using the detection mode signal containing the ID exchanged during device authentication 400, which is "1,0,1,0,0,1,0,1" in the example shown in FIG. 4 (R401 to R406). In the case where the power transmitting apparatus 20 is distanced from the power receiving apparatus 30 and the latter is not in an area where power can be received, the transmitted power is not consumed even if the power receiving apparatus 30 carries out load modulation, and thus the intermittent transmission in T401 to T404 is almost entirely reflected. When, as the power receiving apparatus 30 approaches the power transmitting apparatus 20, the power receiving apparatus 30 enters into the power transmission area 702 shown in FIG. 7, modulated power resulting from the load modulation performed by the power receiving apparatus 30 begins to be transmitted, as indicated by intermittent transmission T405.

In the case where the power transmitting apparatus 20 has begun to modulate the transmitted power using the ID and intermittent transmission is underway, the transmission period of the intermittent transmission is extended to the starting point of the next detection mode signal, which in FIG. 4 is the starting point of the ID. Although the detection mode signal is configured only of the ID in FIG. 4, it should be noted that other information may be included as well, such as a start bit sequence, a stop bit sequence, and the like. Furthermore, although for the sake of simplicity FIG. 4 illustrates the detection mode signal as containing only the ID and the transmission period being extended based on partial ID detection, the transmission period may be extended based on the partial detection of the detection mode signal. After extending the transmission period of the intermittent transmission to the starting point of the next detection mode signal, the power transmitting apparatus 20 furthermore continues to transmit power until the end of that detection mode signal in order to obtain the ID. In FIG. 4, the power transmitting apparatus 20 continues to transmit power until the ID in the next detection mode signal is detected. Thereafter, the power transmitting apparatus 20 examines whether the detected ID matches the ID determined through the device authentication, and in the case where the IDs match, the power transmitting apparatus 20 sends an ID match notification T406. The ID match notification T406 may be sent from the communication unit 22 of the power transmitting apparatus 20 to the communication unit 32 of the power receiving apparatus 30, or the transmitted power may be modulated and transmitted as an ID match notification signal by controlling the constant power transmitting unit 214, the switch 215, and so on. After the ID match notification is sent, the power transmitting apparatus 20 starts intermittent transmission for detecting the receiving efficiency (T407 to T409).

Upon receiving the intermittent power after detecting the ID match notification after the power from the power transmitting apparatus 20 has exceeded a predetermined value, the power receiving apparatus 30 measures the received power each time the power is intermittently received, and carries out the load modulation using that value (R407 to R409). The power transmitting apparatus 20 may detect the received power value from the load modulation value and calculate the receiving efficiency by comparing the power sent by the power transmitting apparatus 20 with the power that has been received. In the example shown in FIG. 4, the receiving efficiency exceeds a predetermined threshold at the third intermittent transmission T409; it is determined that the power receiving apparatus 30 has entered the area 703 for transmission at the appropriate efficiency indicated in FIG. 7, and the power transmission switches to normal power transmission T410. Although in FIG. 4, the power receiving apparatus 30 sends the received power amount through load modulation, it should be noted that the received power amount may be transmitted from the communication unit 32 to the communication unit 22 of the power transmitting apparatus 20.

Note also that although the power transmitting apparatus 20 starts the intermittent transmission for measuring the receiving efficiency after the ID matching notification T406 in FIG. 4, the method for measuring the receiving efficiency is not limited thereto. That is, the power receiving apparatus 30 may notify the power transmitting apparatus 20 of the received power amount when at low impedance during the load modulation based on the detection mode signal, or in other words, when "0" is sent at R406, may detect the received power amount when the ID matching notification T406 is received and notify the power transmitting apparatus 20, and so on. Methods such as load modulation during ID matching notification and out-of-band communication using the communication unit 32 can be considered as methods for giving notice of the received power amount. Alternatively, another transmission period may be provided after the ID matching notification, and notice of the received power amount may be given then. It is clear that intermittent transmission for detecting the receiving efficiency is unnecessary if the power received during modulation based on the detection mode signal, when the ID match notification is made, and so on exceeds the predetermined threshold.

Figure 5A:
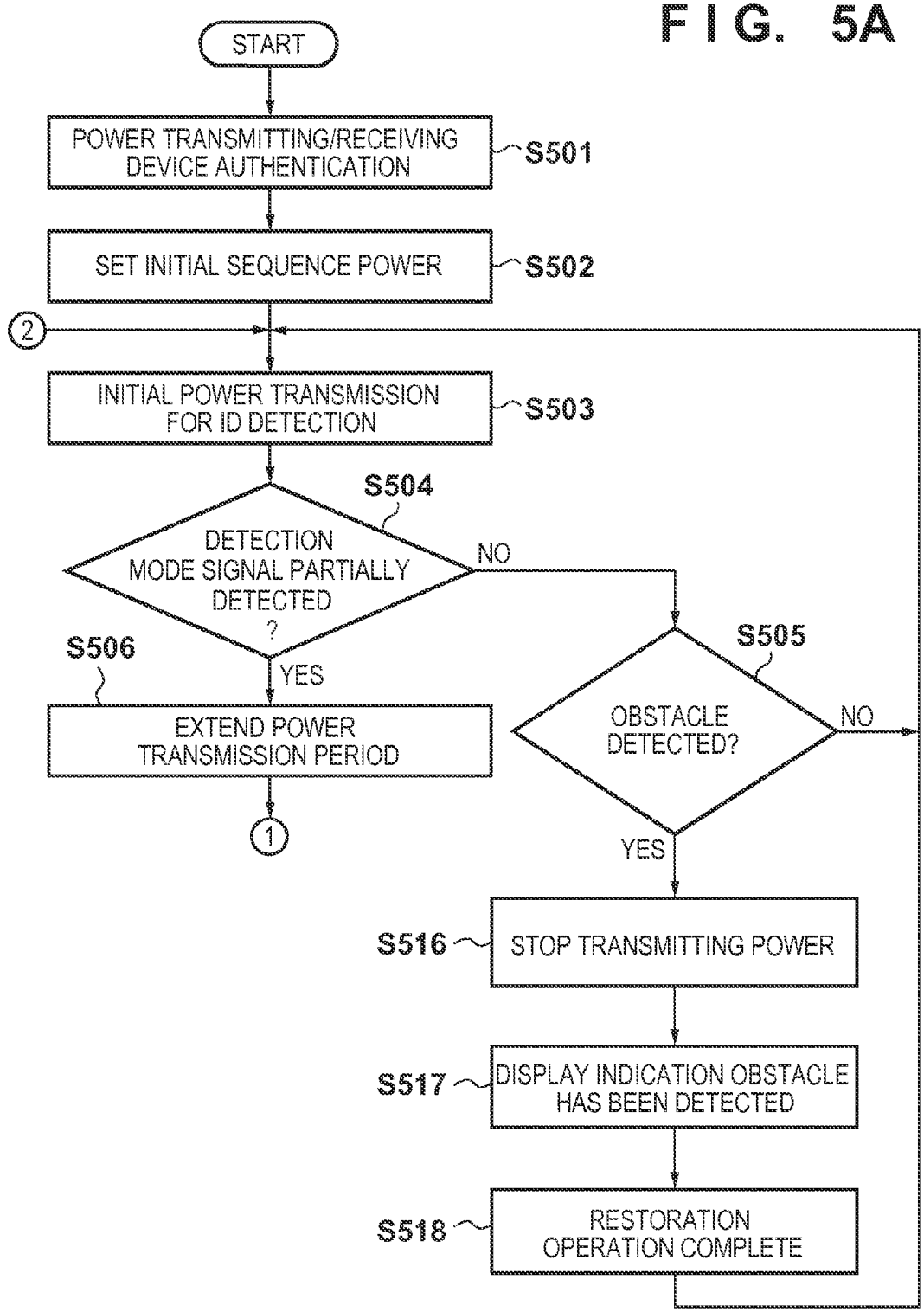
FIGS. 5A to 5B are flowcharts illustrating operations performed by the power transmitting apparatus according to the first embodiment.
Figure 5B:
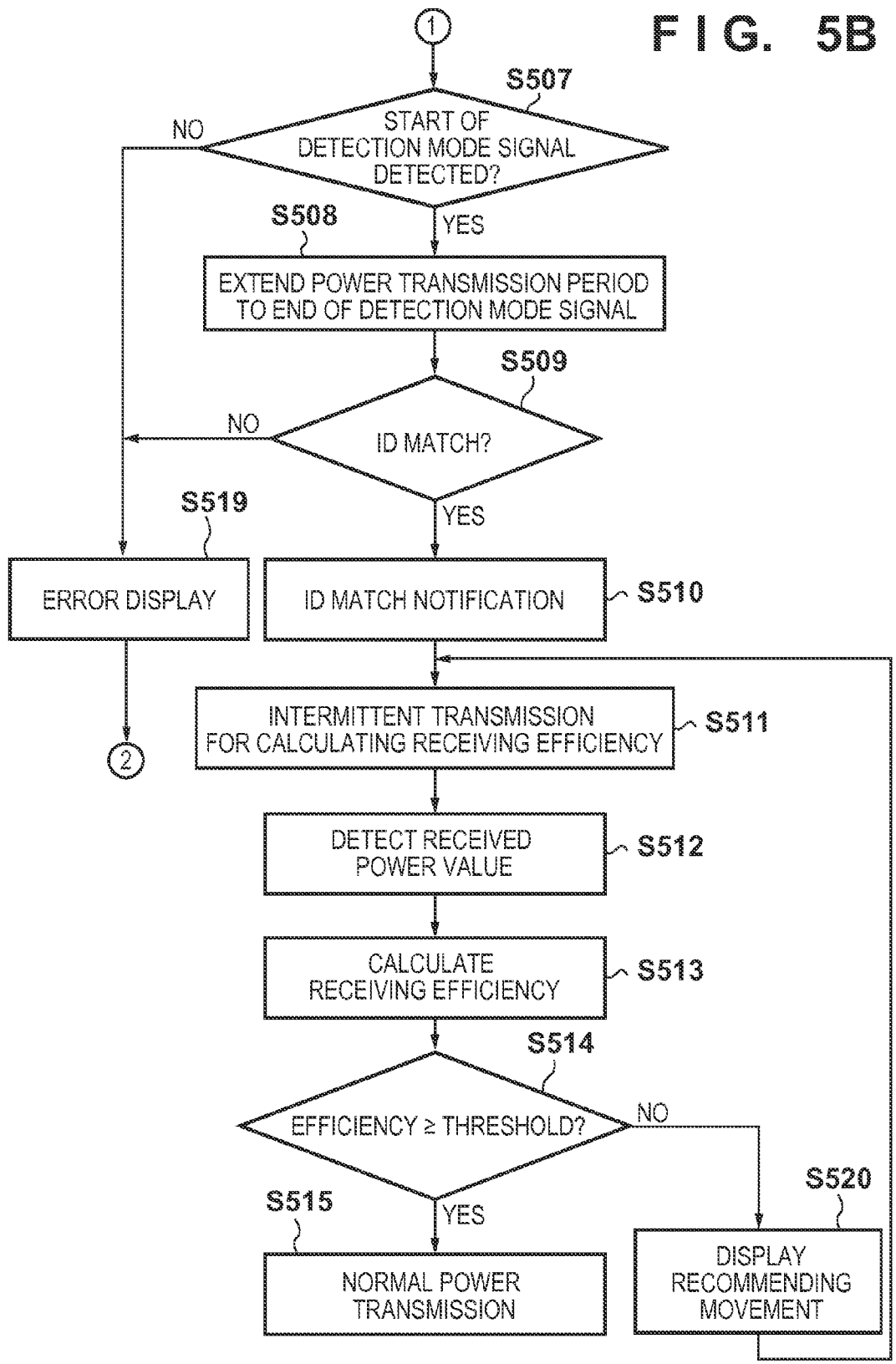

Next, operations performed by the power transmitting apparatus 20 will be described with reference to FIGS. 2 and 5. FIG. 5 is an example of a flowchart illustrating operations performed by the power transmitting apparatus 20, from device authentication to normal power transmission. When the transmitting/receiving device authentication is complete (S501), the initial power transmitting unit 2121 sets the transmission power of the constant power transmitting unit 214 to an initial setting power (S502), and starts the initial power transmission for ID detection (S503). When intermittent transmission is carried out, the initial power is intermittently transmitted using the switch 215. The receiving impedance detection unit 213 continually monitors the impedance during the period of intermittent transmission, and a device that has been load-modulated using the detection mode signal including the ID determined in device authentication S501 is detected. Here, the initial impedance storage unit 217 stores, in advance, an initial impedance occurring in a state where devices that can receive power at the transmitted frequency, obstacles such as metal, and so on are not present in the periphery of the power transmitting apparatus 20.

In the case where the receiving impedance detection unit 213 has detected an impedance that differs from the initial impedance (Yes in S504), the obstacle detection unit 2127 determines that an obstacle is present. Specifically, the obstacle detection unit 2127 determines that an obstacle has been detected in the case where an impedance that could not result from the load modulation using the aforementioned ID has been detected (Yes in S505). Then, the receiving impedance detection unit 213 stops the transmission of power by controlling the switch 215 via the CPU 212 (S516) and displays an error, indicating that an obstacle has been detected, in the display unit 27 (S517). For example, in the case where the receiving impedance detection unit 213 has detected a constant impedance that differs from the initial impedance, it is possible that a metal object or the like has approached; an indication that a metal object is present is then displayed in the display unit 27, prompting a user to move the object. Likewise, in the case where the receiving impedance detection unit 213 has detected a load modulation in a different format than the power receiving apparatus 30, a different model of a power receiving apparatus, a device communicating in the same band, or the like is present in the vicinity; an indication thereof is then displayed in the display unit 27, prompting the user to move the device. Here, the power transmitting apparatus 20 has stopped transmitting power, and thus after the user has removed the obstacle, an operation such as the user pushing a button (not shown) indicating that the obstacle has been removed is detected (S518), and the process returns to the initial power transmission for ID detection (S503). However, in the case where the power transmitted in the initial power transmission for ID detection is sufficiently low or the amount of time for which the obstacle is detected is sufficiently short and there is little likelihood of damage caused by the obstacle emitting heat or receiving power (No in S504, No in S505), the process may return to the initial power transmission for ID detection (S503) without the user performing such a restoration operation.

In the case where the impedance detected by the receiving impedance detection unit 213 is the same as the initial impedance and the detection mode signal detecting unit 2123 has partially detected the detection mode signal (Yes in S504), the process advances to S506 in the case where the initial power is being intermittently transmitted. Then, the power transmission period extension unit 2122 extends the period of the intermittent transmission to a time at which the starting point of the next detection mode signal is detected (S506). The process of S506 is unnecessary in the case where the initial power is being continuously transmitted. Here, in the case where the starting point of the next detection mode signal is not detected within a set period, it is possible that the detection mode signal detecting unit 2123 has detected the load modulation of, for example, a power receiving apparatus operating according to another standard, or that the desired power receiving apparatus 30 has left the area. In this case, the detection mode signal detecting unit 2123 makes an error display in the display unit 27, prompting the user to respond (S519). Thereafter, the process returns to the initial power transmission for ID detection, and it is confirmed that the device operating according to another standard has been removed or that the desired power receiving apparatus 30 has been detected. In the case where the detection mode signal detecting unit 2123 has detected the starting point of the detection mode signal (Yes in S507) and the initial power is being intermittently transmitted, the power transmission period extension unit 2122 extends the transmission period until the detection mode signal ends (S508). Here, in the case where the starting point of the detection mode signal has been detected in S504, it follows that the starting point of the detection mode signal has already been detected in S507, and thus the transmission period can be extended until the detection mode signal ends.

The ID match determination unit 2124 examines whether the ID determined in the device authentication matches the ID detected from the detection mode signal (S509). In the case where the IDs differ (No in S509), it is possible that a different power receiving apparatus operating according to the same standard and that has completed authentication with another power transmitting apparatus is present in the vicinity, and thus a display to that effect is made in the display unit 27, prompting the user to move the apparatus (S519). Thereafter, the process returns to the initial power transmission for ID detection, and it is confirmed that the other power receiving apparatus operating according to the same standard has been removed. In the case where the ID match determination unit 2124 has determined that the IDs match (Yes in S509), an ID match notification is sent (S510). The ID match determination unit 2124 may send the ID match notification from the communication unit 22 to the communication unit 32 of the power receiving apparatus 30, or by controlling the constant power transmitting unit 214, the switch 215, and so on, the transmitted power may be modulated and transmitted as an ID matching notification signal. After the ID match notification has been sent, the initial power transmitting unit 2121 starts the intermittent transmission for detecting the receiving efficiency (S511). Upon receiving the intermittently-transmitted power, the power receiving apparatus 30 measures the power received with each reception and carries out load modulation at that value. The receiving efficiency calculation unit 2125 detects the received power value from the load modulation value (S512) and calculates the receiving efficiency by comparing the power the power transmitting apparatus 20 has sent with the power that has been received (S513). In the case where the receiving efficiency is less than or equal to a predetermined threshold, the receiving efficiency calculation unit 2125 determines that the power receiving apparatus 30 is not within the area 703 for transmission at the appropriate efficiency indicated in FIG. 7, and displays, in the display unit 27, a recommendation for moving the power receiving apparatus into a proper position (S520). However, in the case where the receiving efficiency exceeds the threshold, the receiving efficiency calculation unit 2125 determines that the power receiving apparatus is within the area 703 for transmission at the appropriate efficiency, and the process is switched to normal power transmission by the normal power transmitting unit 2126 (S515).

Figure 6:
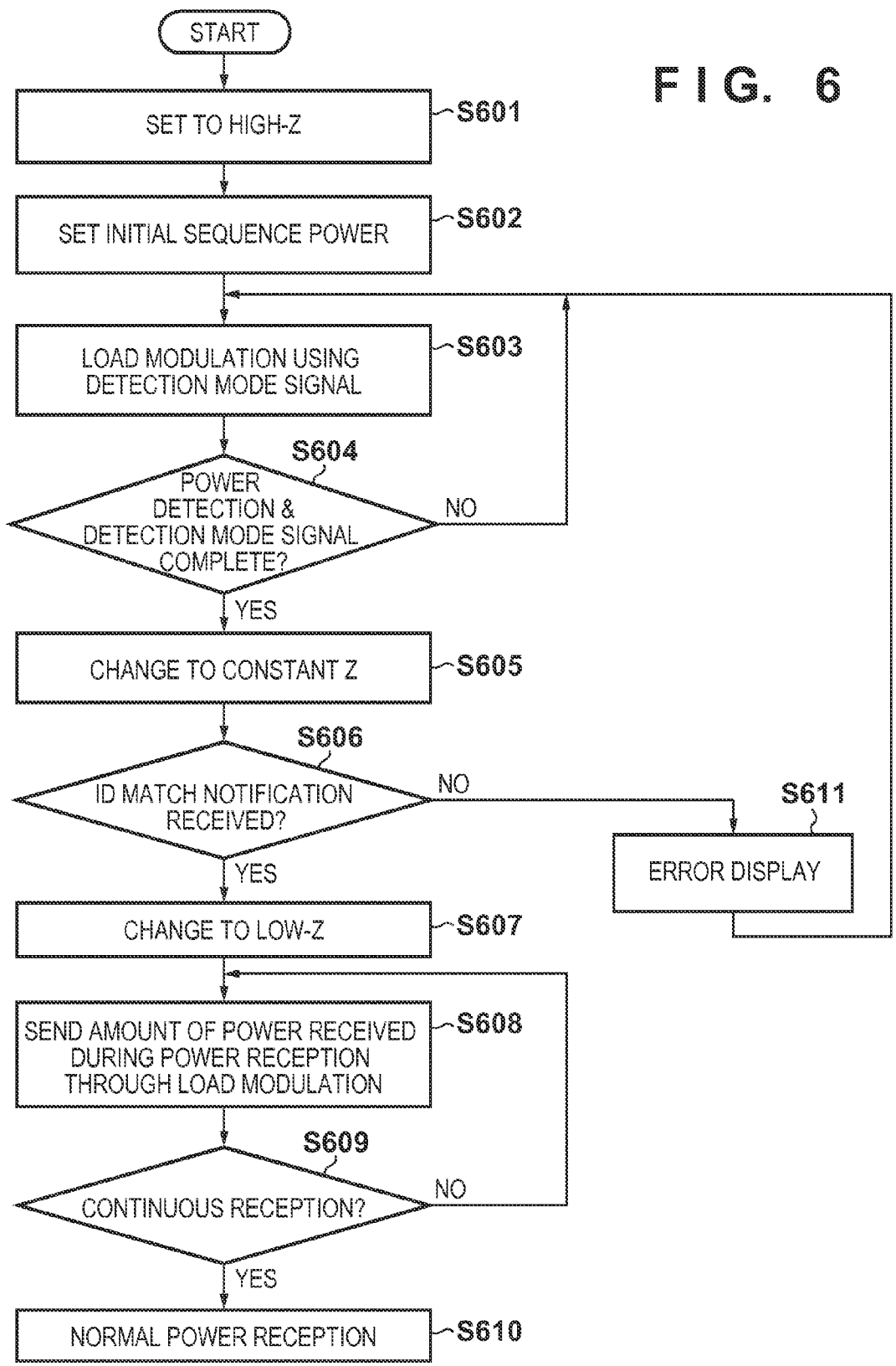
FIG. 6 is a flowchart illustrating operations performed by the power receiving apparatus according to the first embodiment.

Next, operations performed by the power receiving apparatus 30 will be described with reference to FIGS. 3 and 6. FIG. 6 is an example of a flowchart illustrating operations performed by the power receiving apparatus 30, from device authentication to normal power transmission. The impedance changing unit 313 sets the impedance of the antenna 33 or a load (not shown) (that is, the receiving impedance) to a higher level until the device authentication (S602) with the power transmitting apparatus 20 ends, and ensures that power will not be received from a power transmitting apparatus operating according to another standard, an unauthorized power transmitting apparatus operating according to the same standard, and so on (S601). This prevents heat emission, damage, and so on in the power receiving apparatus. After the device authentication (S602), the power receiving apparatus 30 carries out load modulation using the detection mode signal including the IDs exchanged in the device authentication (S603). This detection mode signal is generated by the detection mode signal generating unit 3121. This load modulation may be carried out by the impedance changing unit 313 shown in FIG. 3, or may be carried out by changing the load of the AC power conversion unit 314. The load modulation may further be carried out by turning an antenna switch (not shown) on and off.

Although the power receiving apparatus 30 will receive almost no power while the power receiving apparatus 30 is far from the power transmitting apparatus 20 (No in S604), when the power receiving apparatus 30 approaches the power transmitting apparatus 20 and enters the power transmission area 702 shown in FIG. 7, the power transmitted by the power transmitting apparatus 20 is modulated according to the load modulation of the power receiving apparatus 30 and is then received (Yes in S604). In other words, a state of power detection is achieved. If the apparatus transmitting power is the apparatus authenticated in the device authentication (S602), the ID match notification is sent from the power transmitting apparatus 20 after the load modulation of the detection mode signal performed by the power receiving apparatus 30 has ended (S603, Yes in S604). Accordingly, the impedance changing unit 313 sets the receiving impedance to an impedance at which the ID match notification can be received after the modulation using the next detection mode signal after power has been detected is complete (S605). However, the ID match notification may be carried out using the communication units 22 and 23. Although the detection mode signal modulation stops after the power is detected in FIG. 6, it should be noted that the detection mode signal modulation may continue until the ID match notification is received. Furthermore, in the case where the ID match notification is sent and received using the communication units 22 and 32, the impedance changing unit 313 may increase the receiving impedance after the detection mode signal modulation ends.

Meanwhile, in the case where the ID match notification is not received even after power is detected (No in S606), it is possible that power is being transmitted from a power transmitting apparatus operating according to another standard or that power is being received from a different power transmitting apparatus of the same model, and thus an error is displayed in the display unit 37 (S611), prompting the user to move the power receiving apparatus 30 to another position. In the case where the power receiving apparatus 30 has received the ID match notification (Yes in S606), the impedance changing unit 313 reduces the receiving impedance (S607) and receives the intermittent transmission of power for calculating the receiving efficiency. The power receiving apparatus 30 replies with an indication of the received power through load modulation, or replies with information indicating the received power via the communication units 32 and 22, each time power is received (S608). However, the power receiving apparatus 30 only returns a notification of the received power through load modulation, or makes a reply indicating the received power via the communication units 32 and 22, each time power is received (S611), and this process continues until it is determined that power is to be continuously received (No in S609). When it is determined that power is to be continuously received (Yes in S609), the normal power receiving (S610) begins.

In this manner, the power transmitting apparatus 20 according to the present embodiment does not start transmitting power unless a transmission target that has been authenticated has entered a desired area where power can be supplied and the transmission target matches a desired transmission target. This makes it possible to prevent the emission of heat, damage due to power being transmitted, and so on in non-transmission targets. Furthermore, the power receiving apparatus 30 according to the present embodiment reduces the receiving impedance only in the case where power is supplied from an authenticated power transmitting apparatus, which makes it possible to prevent the unnecessary receiving of power from an unauthenticated device and reduce the possibility of damage to the device.

Although the present embodiment describes the power transmitting apparatus 20 as starting normal power transmission in the case where the receiving efficiency is greater than or equal to a threshold after an ID match has been determined, the normal power transmission may simply be started after the ID match has been determined. In addition, although the power transmitting apparatus 20 determines the appropriate positional relationship with the power receiving apparatus 30 based on the receiving efficiency that can be calculated from the power received by the power receiving apparatus 30, a value aside from the receiving efficiency may be used for this determination as long as it is a value obtained based on the power received by the power receiving apparatus 30. Finally, although the present embodiment describes the power transmitting apparatus intermittently transmitting power in order to calculate the receiving efficiency, a process for calculating the receiving efficiency through continuous power transmission may be carried out.

Second Embodiment

The present embodiment will be described with reference to the drawings. A wireless power transmitting system according to the present embodiment is the same as the system illustrated in FIG. 1 and described in the first embodiment, and thus descriptions thereof will be omitted. The power transmitting apparatus 20 and the power receiving apparatus 30 according to the present embodiment differ from those described in the first embodiment in terms of the power transmitting section 21 and the power receiving section 31.

Figure 8:
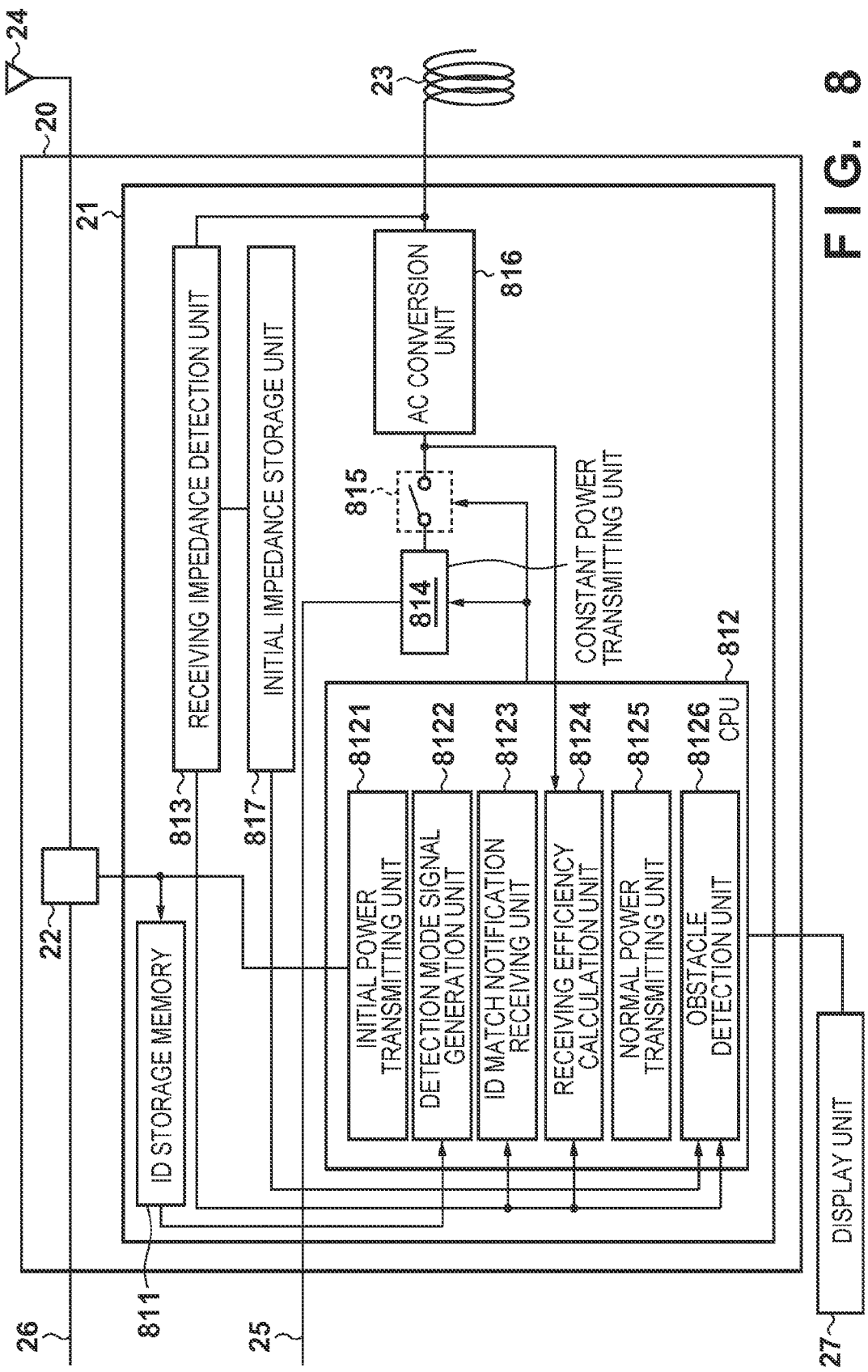
FIG. 8 is a diagram illustrating the configuration of a power transmitting section in a power transmitting apparatus according to a second embodiment.

FIG. 8 is a block diagram illustrating in detail an example of the internal configuration of the power transmitting section 21 of the power transmitting apparatus 20. A CPU 812 includes an initial power transmitting unit 8121, a detection mode signal generation unit 8122, an ID match notification receiving unit 8123, a receiving efficiency calculation unit 8124, a normal power transmitting unit 8125, and an obstacle detection unit 8126. The functions of the respective units in the CPU 812 will be described later. The display unit 27 displays information input to the CPU 812 from the respective units. A constant power transmitting unit 814 is a constant voltage source, and a power required to receive power, a power required for an initial power transmission sequence (called an "initial sequence" hereinafter), and the like are set by the initial power transmitting unit 8121 of the CPU 812. The initial power transmitting unit 8121 may further transmit the initial power in cyclical intermittent transmission. The power transmitting apparatus 20 can also send basic data to the power receiving apparatus 30 by modulating the output of the constant power transmitting unit 814.

A switch 815 is used when performing cyclical intermittent transmission of the initial power in the initial sequence. The switch 815 may be used to send basic data to the power receiving apparatus 30 by turning the switch 815 on and off. An AC conversion unit 816 converts DC power or AC power from an AC outlet or the like into a frequency for power transmission. Although the switch 815 is disposed between the constant power transmitting unit 814 and the AC conversion unit 816 in FIG. 8, any position may be used as long as the output power can be turned on and off, and thus the switch 815 may be disposed before the constant power transmitting unit 814, after the AC conversion unit 816, and so on. Furthermore, the AC power output may be turned on and off by turning a driving signal for a switching element (not shown) within the AC conversion unit 816 on and off, instead of providing the switch 815. The AC conversion unit 816 converts DC power or AC power from an AC outlet or the like into a frequency for power transmission.

A receiving impedance detection unit 813 detects load modulation carried out in the power receiving apparatus 30 as well as impedance changes in the antenna 33, other parts of the power receiving section 31, and so on. The receiving impedance detection unit 813 generally detects the receiving impedance by detecting reflections caused by mismatches between an impedance on the power transmitting apparatus 20 side, including the transmission antenna 23, and an impedance on the power receiving apparatus 30 side. Generally, the efficiency of coupling between power transmitting and receiving changes as the positional relationship of the power transmitting and receiving apparatuses changes, and thus reflections caused by mismatches will change even if the receiving impedance of the power receiving apparatus 30 remains the same. However, the receiving impedance detection unit 813 can distinguish between a change in the receiving impedance and positional variation by the power receiving apparatus 30 replying with a signal or the like indicating power reception through load modulation.

An initial impedance storage unit 817 stores an initial impedance occurring when there is nothing in the periphery of the power transmitting apparatus 20. When, during initial power transmission, the receiving impedance detection unit 813 detects an impedance that differs from the initial impedance without load modulation from the power receiving apparatus 30, the obstacle detection unit 8126 stops the initial power transmission by controlling the switch 815. The obstacle detection unit 8126 then displays an error display indicating that an obstacle has been detected in the display unit 27. An ID storage memory 811 stores an ID determined through the device authentication performed by the communication unit 22. The detection mode signal generation unit 8122 generates the detection mode signal based on the ID stored in the ID storage memory 811. The output of the constant power transmitting unit 814 is modulated using the generated detection mode signal and transmitted. Note that power modulated using the detection mode signal by turning the switch 815 on and off may be transmitted.

The power receiving apparatus 30 that has been authenticated receives the transmitted power modulated using the detection mode signal, and upon confirming an ID match, sends an ID match notification. The power transmitting apparatus 20 receives the ID match notification through load modulation of the transmitted power or via the communication unit 22. When the ID match notification receiving unit 8123 receives the ID match notification, the power transmitting apparatus 20 can confirm that the power receiving apparatus 30 has entered an area in which power can be received from the power transmitting apparatus 20.

After the ID match notification has been received, the power transmitting apparatus 20 performs intermittent transmission for calculating the receiving efficiency. Upon receiving the intermittent transmission for calculating the receiving efficiency, the power receiving apparatus 30 load-modulates the received power amount or sends the received power amount to the power transmitting apparatus 20 via the communication unit 32. Upon detecting the power amount received by the power receiving apparatus 30 from the receiving impedance detection unit 813 or from the communication unit 22, the receiving efficiency calculation unit 8124 of the CPU 812 calculates the receiving efficiency by comparing the received power amount with the transmitted power. In the case where the receiving efficiency is lower than a predetermined threshold, the receiving efficiency calculation unit 8124 displays an indication that the receiving efficiency is poor in the display unit 27, and prompts the power receiving apparatus 30 to be moved to an appropriate position. On the other hand, in the case where the receiving efficiency calculation unit 8124 determines that the receiving efficiency exceeds the threshold, the normal power transmitting unit 8125 starts normal power transmission. It is desirable for the power transmission in the initial sequence to be intermittent transmission so that even in the case where power has been transmitted to an obstacle, a heat dissipation period is provided for the obstacle in order to suppress a steady rise in temperature caused by continuous power transmission. For example, transmitted power modulated during a detection mode signal period and a stopped period for dissipating heat in an obstacle is taken as a single cycle of power transmission. However, power can also be transmitted continuously in the initial sequence in the case where a sufficiently small amount of power is transmitted in the initial sequence and an obstacle is detected for a sufficiently short amount of time in the initial sequence, and the detection mode signal includes breaks such as a start bit, a stop bit, and so on.

Figure 9:
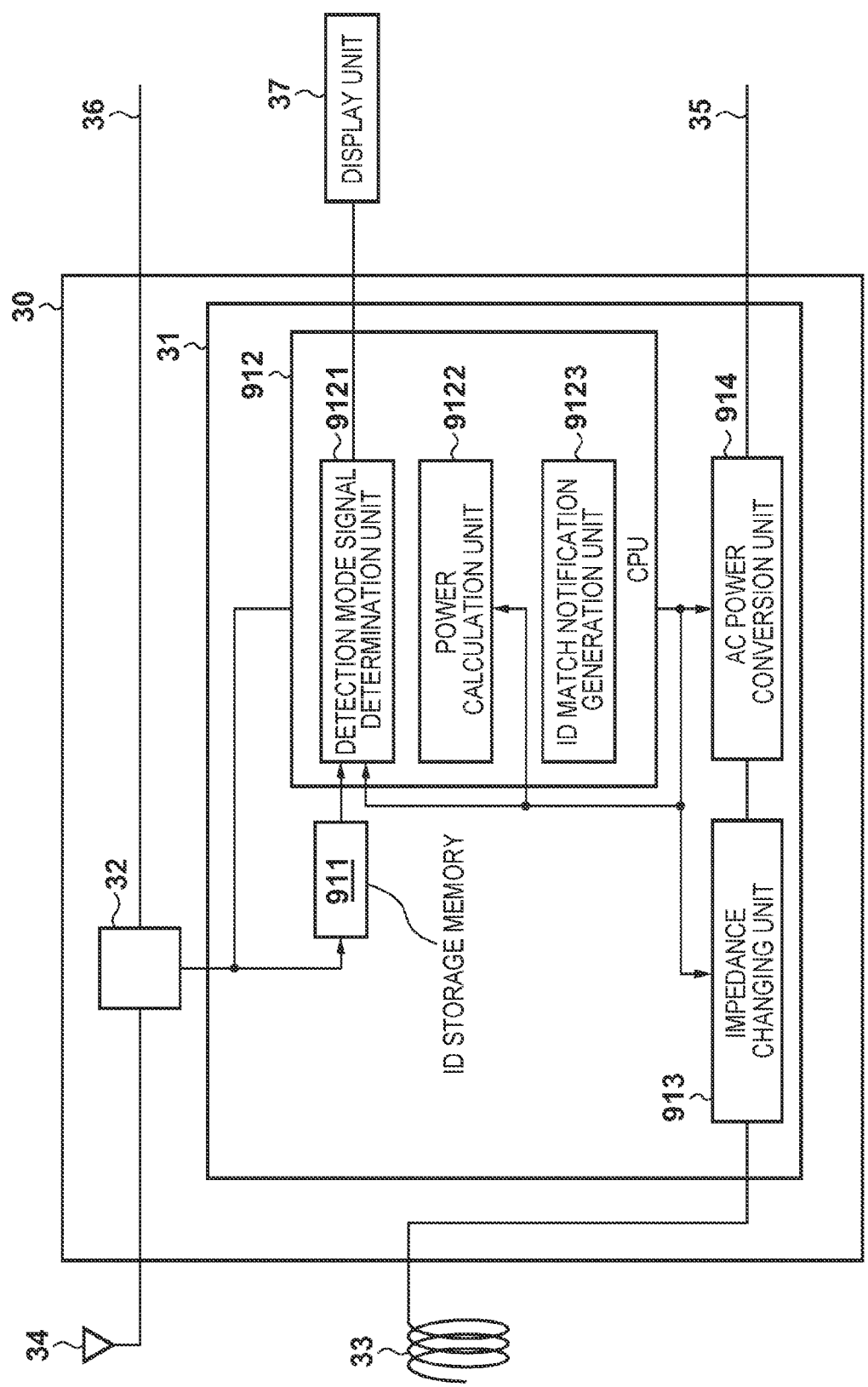
FIG. 9 is a diagram illustrating the configuration of a power receiving section in a power receiving apparatus according to the second embodiment.

FIG. 9 is a block diagram illustrating in detail an example of the internal configuration of the power receiving section 31 of the power receiving apparatus 30 shown in FIG. 1. A CPU 912 includes a detection mode signal determination unit 9121, a power calculation unit 9122, and an ID match notification generation unit 9123. The functions of the respective units in the CPU 912 will be described later. The display unit 37 displays information input to the CPU 912 from the respective units. An AC power conversion unit 914 includes a rectifier circuit, a constant voltage source, and so on. An impedance changing unit 913 adjusts the alignment of the receiving antenna 33, and furthermore carries out load modulation in the case where data is to be transmitted to the power transmitting apparatus using the power transmission/receiving frequency band. As long as the authentication by the communication unit 32 has not ended, the impedance changing unit 913 sets the impedance on the circuit side relative to the receiving antenna 33 to a high impedance. The receiving impedance is reduced when the authentication by the communication unit 32 has ended.

An ID storage memory 911 stores an ID determined through the authentication performed by the communication unit 32. When the communication unit 32 detects a power signal from the power transmitting apparatus 20, the detection mode signal determination unit 9121 determines whether or not that signal is the detection mode signal. In the case where the signal is the detection mode signal and the ID contained in the detection mode signal matches the ID stored in the ID storage memory 911, the ID match notification generation unit 9123 generates an ID matching notification and sends the notification to the power transmitting apparatus 20. Furthermore, the power calculation unit 9122 calculates the received power amount detected by the AC power conversion unit 914 and sends the received power amount to the power transmitting apparatus 20 through load modulation or via the communication unit 32.

Figure 10:
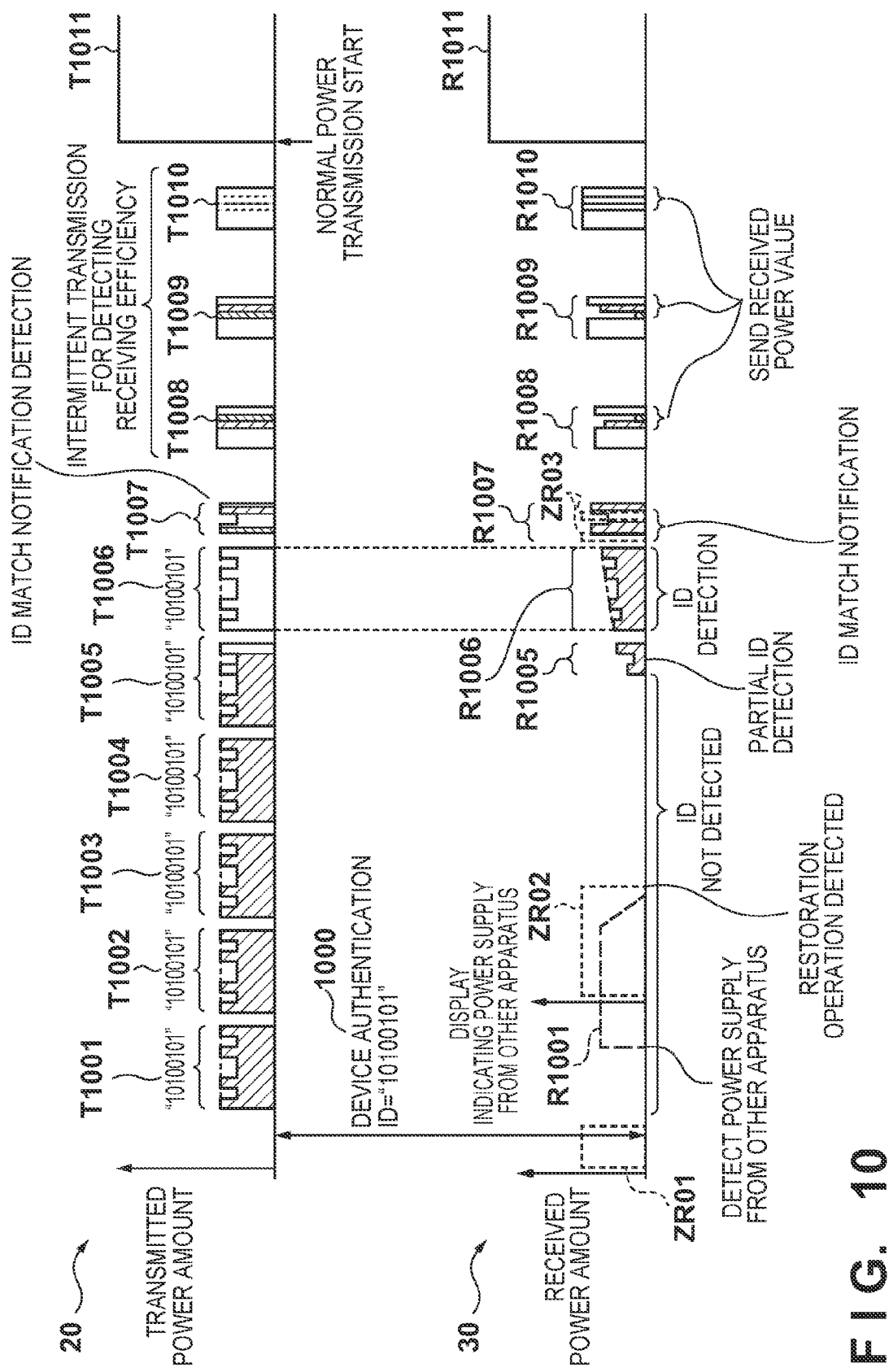
FIG. 10 is a timing chart of a wireless power transmitting system according to the second embodiment.

Next, operations performed in the initial sequence between the power transmitting apparatus 20 and the power receiving apparatus 30 will be described with reference to FIG. 10. FIG. 10 is a timing chart for the power transmitting apparatus 20 and the power receiving apparatus 30. In FIG. 10, the vertical axis for the power transmitting apparatus 20 schematically indicates an amount of power transmitted, and the vertical axis for the power receiving apparatus 30 schematically indicates an amount of power received. Meanwhile, ZR01 to ZR03 for the power receiving apparatus 30 indicate that the receiving impedance is set to a high value. Note that the following descriptions assume an environment in which the power receiving apparatus 30 approaches the power transmitting apparatus 20 in order to receive power, as shown in FIG. 7. FIG. 7 indicates the communication area 701, the power transmission area 702, and the area 703 in which power transmission can be carried out at a proper efficiency, when the power receiving apparatus 30 approaches the power transmitting apparatus 20.

When the power receiving apparatus 30 enters the communication area 701 of the power transmitting apparatus 20 shown in FIG. 7, the power receiving apparatus 30 begins device authentication with the power transmitting apparatus 20. The power transmitting apparatus 20 and the power receiving apparatus 30 exchange IDs in the device authentication. When device authentication 1000 ends, the power transmitting apparatus 20 starts initial power transmission of power modulated using the detection mode signal at a constant cycle (T1001 to T1007). In the example shown in FIG. 10, the power transmitting apparatus 20 cyclically transmits power modulated using the detection mode signal containing the exchanged ID "1,0,1,0,0,1,0,1". At this time, the initial power transmitting unit 8121 of the CPU 812 sets the minimum necessary power value for the initial sequence leading up to normal power transmission (until ID detection, confirmation of receiving efficiency, and so on in the frequency band of the power receiving apparatus have ended) in the constant power transmitting unit 814. Specifically, the initial power transmitting unit 8121 sets the power modulated using the detection mode signal of the power transmitting apparatus 20 to a power that can be received by the power receiving apparatus 30 in an area that includes the area 703 in which power transmission can be carried out at a proper efficiency. Note that the initial power transmitting unit 8121 may carry out intermittent transmission of the initial power modulated by the detection mode signal, as indicated in FIG. 4.

The power receiving apparatus 30 increases the receiving impedance until the end of device authentication 1000

(ZR01). After the device authentication, the power receiving apparatus 30 changes the impedance to a low impedance, and stands by for the transmission of power modulated using the detection mode signal including the ID determined through the device authentication, which is "1,0,1,0,0,1,0,1" in the example shown in FIG. 10. In the case where the power transmitting apparatus 20 is distanced from the power receiving apparatus 30 and the latter is not in an area where power can be received, the transmitted power is not consumed even if the power receiving apparatus 30 stands by at low impedance, and thus the intermittent transmission in T1001 to T1004 is almost entirely reflected. When, as the power receiving apparatus 30 approaches the power transmitting apparatus 20, the power receiving apparatus 30 enters into the power transmission area 702 shown in FIG. 7, power begins to be transmitted to the power receiving apparatus 30, as indicated by intermittent transmission T1005.

After the device authentication using the communication unit 32, the power receiving apparatus 30 stands by for power transmission at low impedance. Upon receiving power not modulated using the detection mode signal as indicated by R1001, the power receiving apparatus 30 increases the receiving impedance as indicated by ZR02, preventing the power receiving apparatus from being damaged or emitting heat due to a power supply from another apparatus. Furthermore, the power receiving apparatus 30 displays an indication that power is being supplied from another apparatus in the display unit 37, prompting the user to move the power receiving apparatus 30 away from the other power transmitting apparatus. The power receiving apparatus 30 reduces the receiving impedance again when a restoration operation performed by the user, such as the user pressing a button (not shown), has been detected. Here, if the amount of power received from the other device does not result in heat emission above a permitted amount, and if the power is at a level that does not cause damage to the circuitry of the power receiving apparatus 30, it is unnecessary for the power receiving apparatus 30 to increase the receiving impedance, and unnecessary for the user to perform restoration operations.

In the case where the power receiving apparatus 30 has received power R1006 modulated using the detection mode signal after part R1005 of the ID contained in the detection mode signal has been detected, the ID contained in the detection mode signal is detected from a pattern of change of the received amount of the power R1006. The power receiving apparatus 30 then determines whether or not the detected ID matches the ID determined in the device authentication. In the case where the IDs match, the power receiving apparatus 30 sends an ID match notification R1007 to the power transmitting apparatus 20. Although FIG. 10 illustrates an example in which the power transmitting apparatus 20 is notified of an ID match through load modulation performed by changing the receiving impedance of the received power R1007 associated with transmitted power T1007 as indicated by ZR03, it should be noted that the ID detection notification may be made via the communication unit 32. Furthermore, although the detection mode signal is configured only of an ID in FIG. 10, the signal may include other information such as a start bit, a stop bit, or the like.

After detecting the ID match notification, the power transmitting apparatus 20 starts intermittent transmission for detecting the receiving efficiency (T1008 to T1010). Upon receiving the intermittently-transmitted power from the power transmitting apparatus 20 after making the ID match notification, the power receiving apparatus 30 measures the power received with each reception and carries out load modulation at that value (R1008 to R1010). The power transmitting apparatus 20 may detect the received power value from the load modulation value and calculate the receiving efficiency by comparing the power the power transmitting apparatus 20 has sent with the power that has been received. In the example shown in FIG. 10, the receiving efficiency exceeds a predetermined threshold at the third intermittent transmission T1010; it is determined that the power receiving apparatus 30 has entered the area 703 for transmission at the appropriate efficiency indicated in FIG. 7, and the power transmission switches to normal power transmission T1011. Although the power receiving apparatus 30 sends the received power amount through load modulation in FIG. 10, the received power amount may be transmitted to the communication unit 22 of the power transmitting apparatus 20 from the communication unit 32.

Note also that although the power transmitting apparatus 20 starts the intermittent transmission for measuring the receiving efficiency after the ID matching notification T1007 has been received in FIG. 10, the method for measuring the receiving efficiency is not limited thereto. In other words, the power receiving apparatus 30 may notify the power transmitting apparatus 20 of the received power amount at the ID match notification T1006 and the reception T1007, or in other words, by detecting the received power amount at R1006 and R1007. Methods such as load modulation during ID matching notification and out-of-band communication using the communication unit 32 can be considered as methods for giving notice of the received power amount. It is clear that intermittent transmission for detecting the receiving efficiency is unnecessary if the power received during modulation based on the detection mode signal, when the ID match notification is detected, and so on exceeds the predetermined threshold.

Figure 11A:
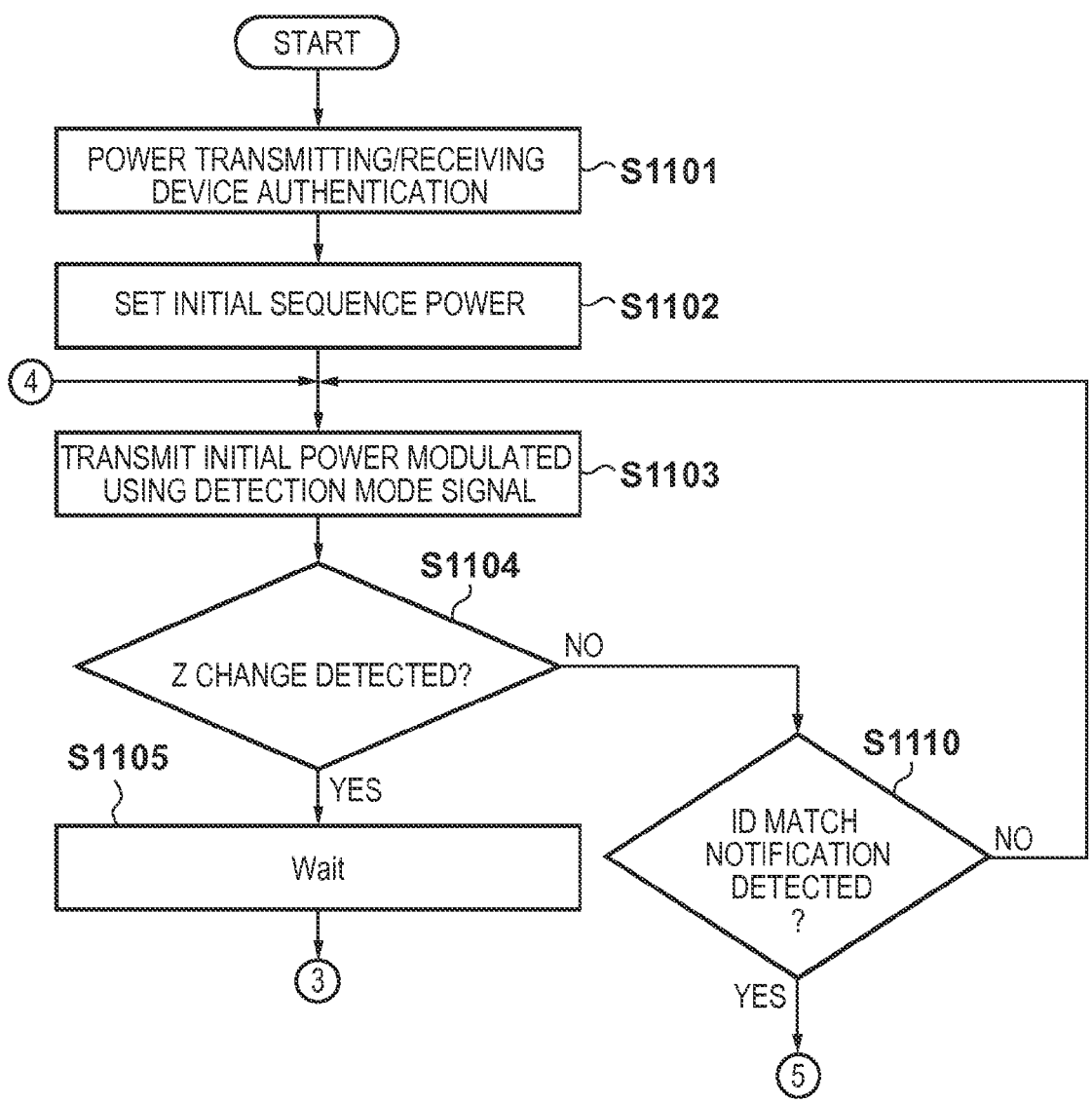

Next, operations performed by the power transmitting apparatus 20 will be described with reference to FIGS. 8 and 11. FIG. 11 is an example of a flowchart illustrating operations performed by the power transmitting apparatus 20, from device authentication to normal power transmission. When the transmitting/receiving device authentication is complete (S1101), the initial power transmitting unit 8121 sets the transmission power of the constant power transmitting unit 814 to an initial setting power (S1102), and starts the initial power transmission as modulated using the detection mode signal (S1103). When the intermittent transmission is carried out, the initial power modulated using the detection mode signal as described above may be transmitted intermittently using the switch 815. The receiving impedance detection unit 813 continually monitors the impedance during the period of initial power transmission, and a device that has been load-modulated using the detection mode signal including the ID determined in device authentication S1101 is detected. Here, the initial impedance storage unit 817 stores, in advance, an initial impedance occurring in a state where devices that can receive power at the transmitted frequency, obstacles such as metal, and so on are not present in the periphery of the power transmitting apparatus 20.

In the case where the receiving impedance detection unit 813 has detected an impedance that is different from the initial impedance (Yes in S1104), the power transmitting apparatus 20 stands by for greater than or equal to the sending cycle of the detection mode signal while continuing the initial power transmission (S1105). Here, in the case where the ID match notification receiving unit 8123 does not receive the ID match notification from the power receiving apparatus 30 (No in S1106), the power transmission is stopped by controlling the switch 815 (S1107) and a display indicating that an obstacle has been detected is made via the display unit 27 (S1108). For example, it is possible that a metal object or the like has approached in the case where a constant impedance that differs from the initial impedance is detected, and thus an indication that a metal object is present is displayed, prompting the user to move the object. Likewise, in the case where the receiving impedance detection unit 813 has detected a load modulation in a different format than the reply from the power receiving apparatus 30, a different model power receiving apparatus, a device communicating in the same band, or the like is present in the vicinity; an indication thereof is then displayed, prompting the user to move the device. Here, the power transmitting apparatus 20 has stopped transmitting power, and thus after the user has removed the obstacle, an operation such as the user pushing a button (not shown) indicating that the obstacle has been removed is detected (S1109), and the process returns to the initial power transmission modulated using the detection mode signal (S1103). However, in the case where the power transmitted in the initial power transmission is sufficiently low or the amount of time for which the obstacle is detected is sufficiently short and there is little likelihood of damage caused by the obstacle emitting heat or receiving power, the process may return to the initial power transmission (S1103) without the power transmission being stopped and without the user performing such a restoration operation.

In the case where the ID match notification receiving unit 8123 has received the ID match notification after the receiving impedance detection unit 813 has detected a change in the impedance (Yes in S1106), the initial power transmitting unit 8121 starts intermittent transmission for calculating the received power (S1111). Here, normally, the power transmitting apparatus 20 detects a change in the impedance when the power receiving apparatus 30 receives power modulated using the detection mode signal. However, in the case where the signal detection sensitivity of the power receiving apparatus 30 is higher than the sensitivity at which the power transmitting apparatus 20 detects a change in the impedance, it is possible that the power transmitting apparatus 20 will detect the ID match notification from the power receiving apparatus even if a change in the impedance cannot be detected. In this manner, the power transmitting apparatus starts the intermittent transmission for calculating the received power (S1111) in the case where the receiving impedance detection unit 813 does not detect a change in the impedance (No in S1104) and the ID match notification receiving unit 8123 has detected the ID match notification (S1110). Note that in the case where the receiving impedance detection unit 813 does not detect a change in the impedance and the ID match notification receiving unit 8123 does not detect the ID match notification, the initial power transmitting unit 8121 continues the initial power transmission modulated using the detection mode signal (No in S1104, No in S1110).

Upon receiving the intermittently-transmitted power for calculating the received power, the power receiving apparatus 30 measures the power received with each reception and carries out load modulation at that value. The receiving efficiency calculation unit 8124 detects the received power value from the load modulation value (S1112) and calculates the receiving efficiency by comparing the power sent by the power transmitting apparatus 20 with the power that has been received using a comparison unit (not shown) in the CPU 812 (S1113). In the case where the receiving efficiency is less than or equal to a predetermined threshold, the receiving efficiency calculation unit 8124 determines that the power receiving apparatus 30 is not within the area 703 for transmission at the appropriate efficiency indicated in FIG. 7, and displays, in the display unit 27, a recommendation for moving the power receiving apparatus into a proper position (S1115). However, in the case where the receiving efficiency exceeds the threshold, the receiving efficiency calculation unit 8124 determines that the power receiving apparatus is within the area 703 for transmission at the appropriate efficiency, and the process is switched to normal power transmission by the normal power transmitting unit 8125 (S1116).

Figure 12A:
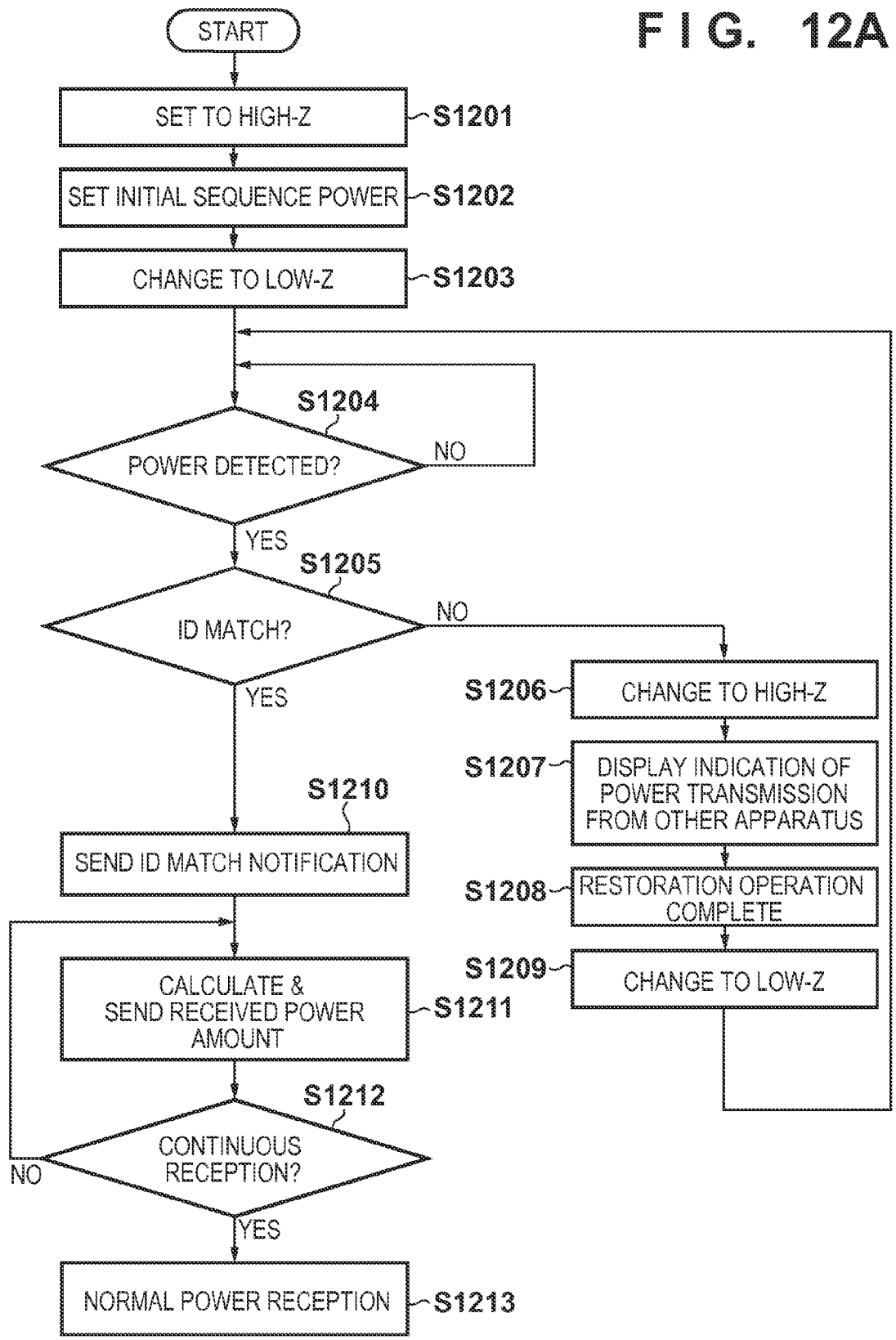
FIG. 12A is a flowchart illustrating operations performed by the power receiving apparatus according to the second embodiment.

Next, operations performed by the power receiving apparatus 30 will be described with reference to FIGS. 9, 12A, and 12B. FIG. 12A is an example of a flowchart illustrating operations performed by the power receiving apparatus 30, from device authentication to normal power transmission. The impedance changing unit 913 sets the impedance of the antenna 33 or a load (not shown) (that is, the receiving impedance) to a higher level until the device authentication (S1202) with the power transmitting apparatus 20 ends, and ensures that power will not be received from a power transmitting apparatus operating according to another standard, an unauthorized power transmitting apparatus operating according to the same standard, and so on (S1201). This prevents heat emission, damage, and so on in the power receiving apparatus. After the device authentication carried out through the communication unit 32, the impedance changing unit 913 reduces the receiving impedance (S1203) and stands by until power is detected (No in S1204).

In the case where the power receiving section 31 has detected power (Yes in S1204), the detection mode signal determination unit 9121 determines whether or not the received power is modulated using the detection mode signal containing the ID determined during authentication. In other words, the detection mode signal determination unit 9121 obtains the ID from the received power and determines whether or not the obtained ID matches the ID stored in the ID storage memory 911. In the case where the detection mode signal determination unit 9121 determines that the IDs do not match (No in S1205), the impedance changing unit 913 increases the receiving impedance (S1206). Doing so prevents damage, the emission of heat, and so on caused by the power receiving apparatus 30 being supplied with power from another apparatus. Furthermore, the detection mode signal determination unit 9121 displays an indication that the power is supplied from another apparatus in the display unit 37 (S1207), prompting the user to distance the power receiving apparatus 30 from the other power transmitting apparatus. The power receiving apparatus 30 then detects a restoration operation performed by the user, such as the user pressing a button (not shown) (S1208), and the impedance changing unit 913 reduces the receiving impedance again (S1209). Here, if the amount of power received from the other apparatus does not result in heat emission above a permitted amount, and if the power is at a level that does not cause damage to the circuitry of the power receiving apparatus 30, it is unnecessary to increase the receiving impedance in S1206, and unnecessary to detect the user restoration operation completion in S1208. Furthermore, the receiving impedance has not advanced and thus it is not necessary to reduce the impedance in S1209.

On the other hand, in the case where the power receiving section 31 has detected power (Yes in S1204) and the detection mode signal determination unit 9121 has determined that the IDs match (Yes in S1205), the ID match notification generation unit 9123 generates the ID match notification and sends the notification to the power transmitting apparatus 20 (S1210). The sending of the ID match notification may be carried out using load modulation, or may be carried out via the communication unit 32. After the ID match notification has been sent, the power receiving apparatus 30 receives the intermittent transmission of power for calculating the receiving efficiency. However, the power receiving apparatus 30 only returns a notification of the received power through load modulation or via the communication units 32 and 22 each time power is received (S1211), and this process continues until a continuous receiving determination unit (not shown) in the CPU 912 determines that power is to be continuously received (No in S1212). When it is determined that power is to be continuously received (Yes in S1212), the normal power receiving (S1213) begins.

Figure 12B:
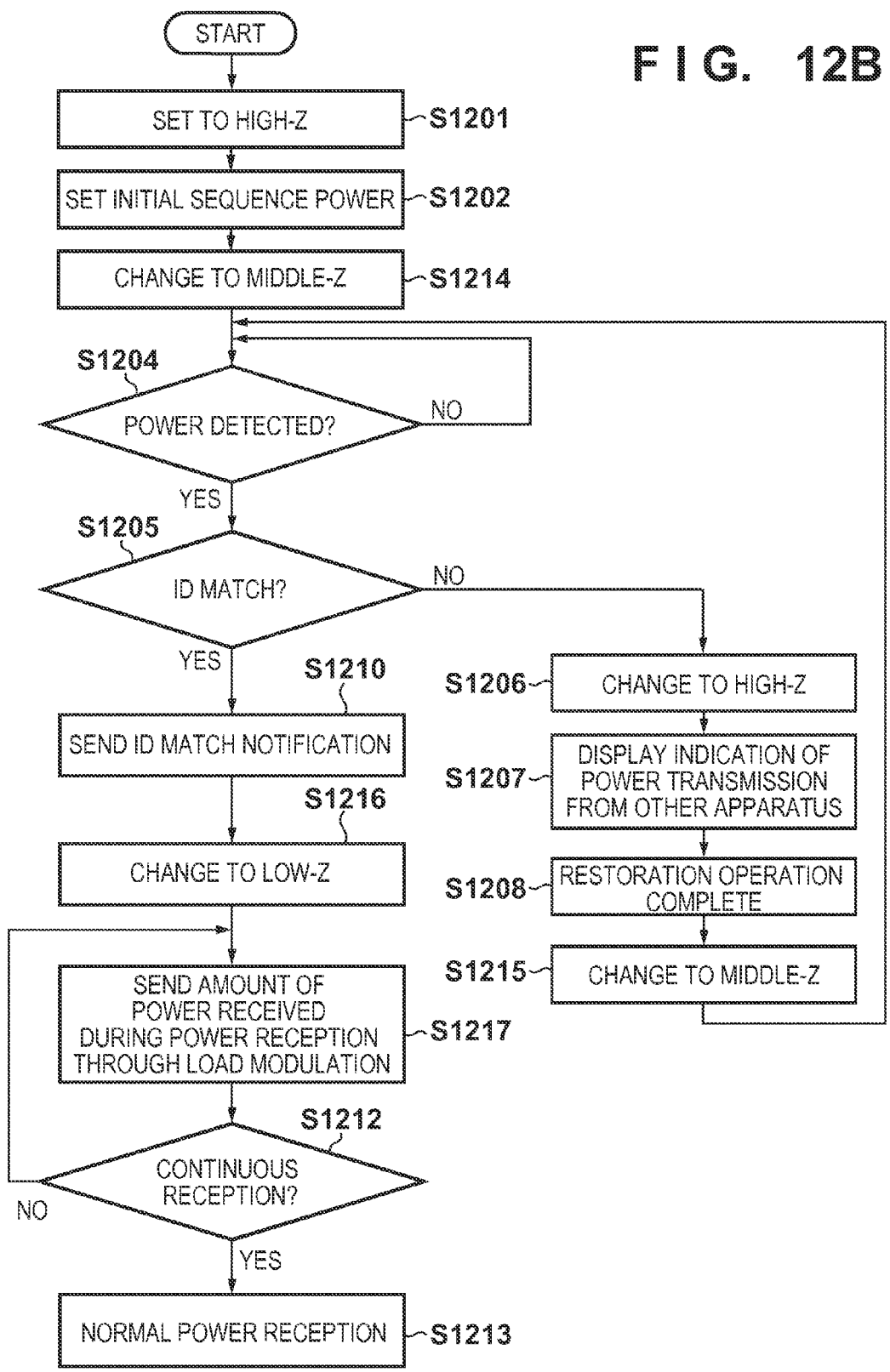
FIG. 12B is a flowchart illustrating other operations performed by the power receiving apparatus according to the second embodiment.

FIG. 12B is a flowchart illustrating another procedure for setting the impedance performed by the power receiving apparatus 30. After the device authentication (S1202), the impedance changing unit 913 sets the receiving impedance to an intermediate value (S1214). Meanwhile, in the case where the IDs do not match (No in S1205) and the impedance changing unit 913 has increased the receiving impedance, the receiving impedance is set to the intermediate value after a restoration operation has been performed by the user (S1215). The impedance changing unit 913 changes the receiving impedance to a low impedance for normal power receiving for the first time after the ID match notification has been sent (S1216). As a result, the power receiving apparatus 30 does not go to the low impedance unless the IDs are confirmed in the power transmission band, which reduces heat emission, damage caused by receiving power, and so on. Note that the order of the processes of S1210 and S1216 may be reversed.

In this manner, the power transmitting apparatus 20 according to the present embodiment does not start transmitting a predetermined power unless a transmission target that has been authenticated has entered a desired area where power can be supplied and the transmission target matches a desired transmission target. This makes it possible to prevent the emission of heat, damage due to power being transmitted, and so on in non-transmission targets. In addition, according to the present embodiment, in the case where the power receiving apparatus 30 is supplied with power from an unauthenticated power transmitting apparatus, the power receiving apparatus 30 detects that power supply and displays an indication thereof. Furthermore, in the case where power has been supplied from an unauthenticated power transmitting apparatus, the power receiving apparatus 30 can increase the receiving impedance and prevent power from being received, making it possible to prevent unnecessary power reception from an unauthenticated device and reduce the possibility of damage to the device.

Although the present embodiment describes the power transmitting apparatus 20 as starting normal power transmission in the case where the receiving efficiency is greater than or equal to a threshold after an ID match notification has been detected, the normal power transmission may simply be started after the ID match notification has been detected. In addition, although the power transmitting apparatus 20 determines the appropriate positional relationship with the power receiving apparatus 30 based on the receiving efficiency that can be calculated from the power received by the power receiving apparatus 30, a value aside from the receiving efficiency may be used for this determination as long as it is a value related to the power received by the power receiving apparatus 30. Finally, although the present embodiment describes the power transmitting apparatus intermittently transmitting power in order to calculate the receiving efficiency, a process for calculating the receiving efficiency through continuous power transmission may be carried out.

Third Embodiment

The present embodiment will be described with reference to the drawings. A wireless power transmitting system according to the present embodiment is the same as the system illustrated in FIG. 1 and described in the first embodiment, and thus descriptions thereof will be omitted. The power transmitting apparatus 20 and the power receiving apparatus 30 according to the present embodiment differ from those described in the first embodiment and the second embodiment in terms of the power transmitting section 21 and the power receiving section 31.

When the operations performed by the power transmitting apparatus 20 according to the first embodiment are taken as a first power transmitting method and the operations performed by the power transmitting apparatus 20 according to the second embodiment are taken as a second power transmitting method, the power transmitting apparatus 20 according to the present embodiment is capable of switching between the two methods. In other words, the internal configuration of the power transmitting apparatus 20 according to the present embodiment is a combination of the configurations shown in FIGS. 2 and 8, and thus descriptions thereof will be omitted. However, it is assumed that the power transmitting apparatus 20 according to the present embodiment includes a selection unit (not shown) for controlling whether to operate according to the first power transmitting method or the second power transmitting method. Likewise, when the operations performed by the power receiving apparatus 30 according to the first embodiment are taken as a first power receiving method and the operations performed by the power receiving apparatus 30 according to the second embodiment are taken as a second power receiving method, the power receiving apparatus 30 according to the present embodiment is capable of switching between the two methods. In other words, the internal configuration of the power receiving apparatus 30 according to the present embodiment is a combination of the configurations shown in FIGS. 3 and 9, and thus descriptions thereof will be omitted.

Figure 13:
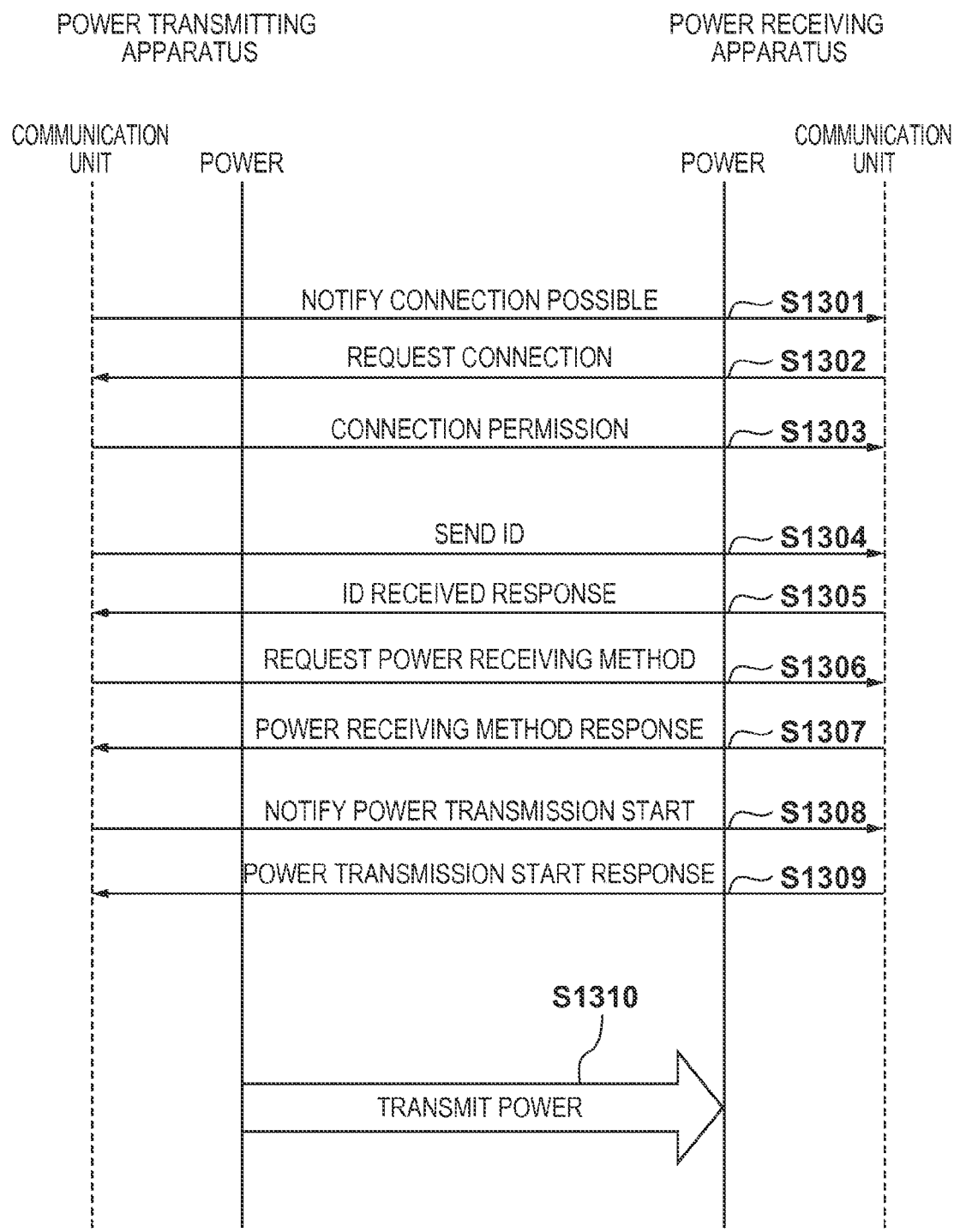
FIG. 13 is a diagram illustrating an authentication sequence in a wireless power transmitting system according to a third embodiment.
Figure 14:
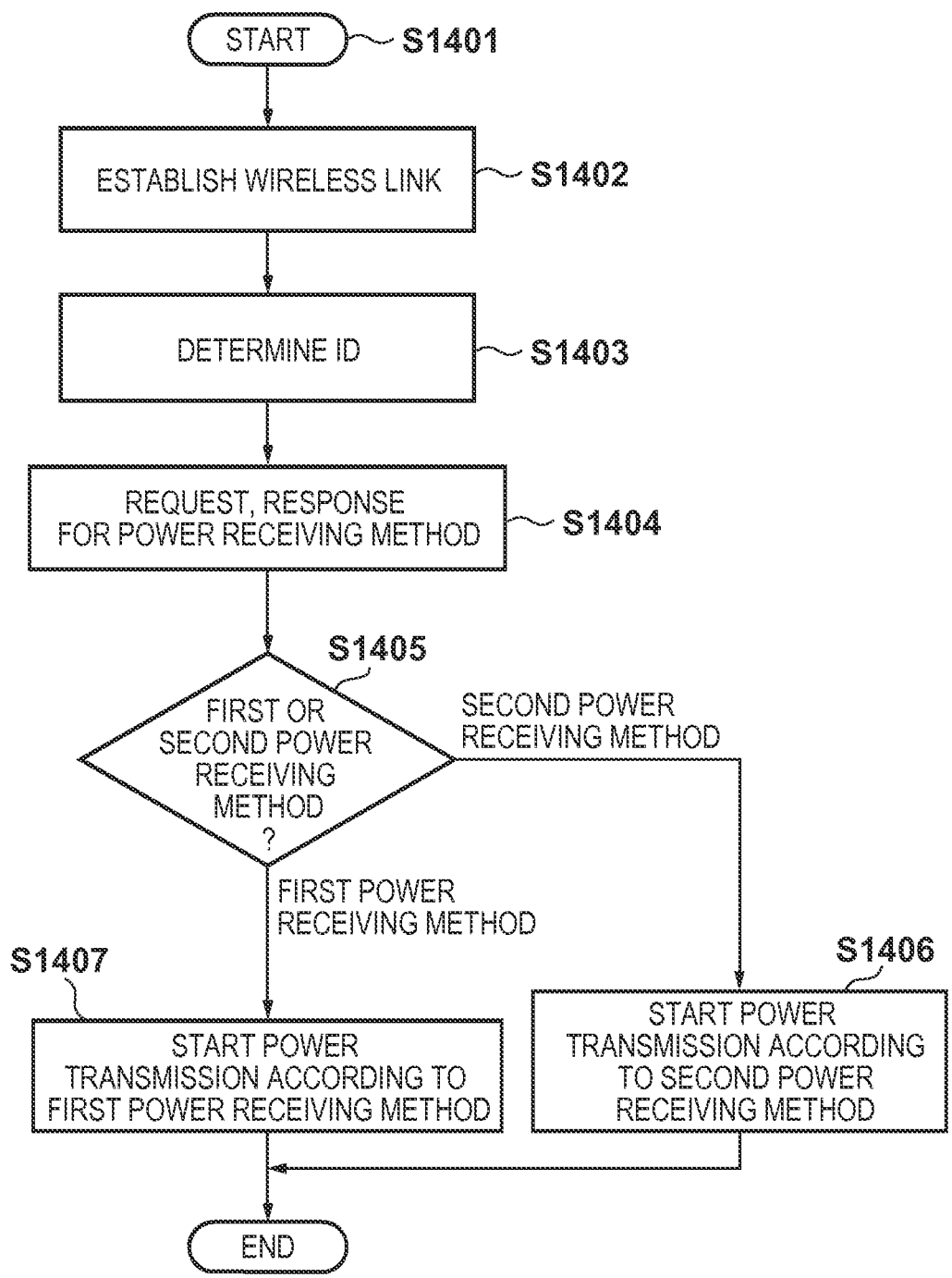
FIG. 14 is a flowchart illustrating operations performed by a power transmitting apparatus according to the third embodiment.

Next, operations performed by the power transmitting apparatus 20 will be described with reference to FIGS. 13 and 14. FIG. 13 is a diagram illustrating an authentication sequence between the power transmitting apparatus 20 and the power receiving apparatus 30. FIG. 14 is a flowchart illustrating operations according to the present embodiment. When starting power transmission, the power transmitting apparatus 20 first carries out authentication with the power receiving apparatus 30. The power transmitting apparatus 20 issues a notification indicating that connection is possible, via the communication unit 22 (S1301). The power receiving apparatus 30, which is located in the communication area 701, receives the notification indicating that connection is possible, and issues a connection request via the communication unit 32 (S1302). The power transmitting apparatus 20 sends permission to connect to the power receiving apparatus 30 (S1303). This establishes a wireless link (S1401). Next, the power transmitting apparatus 20 sends an ID (S1304), and the power receiving apparatus 30 returns a response indicating that the ID has been received (S1305). The ID is determined in this manner (S1402). The foregoing has described the device authentication process.

Furthermore, the power transmitting apparatus 20 requests the power receiving method of the power receiving apparatus 30 (S1306). The power receiving apparatus 30 response to the power transmitting apparatus 20 indicating whether the power receiving method of the power receiving apparatus 30 is the first power receiving method or the second power receiving method (S1307, S1403). In the case where the power receiving apparatus is operating according to the first power receiving method, a response to that effect is made ("first power receiving method" in S1404). The power transmitting apparatus 20 receives this result, sends a power transmission start notification (S1308), and upon the power receiving apparatus 30 returning a response (S1309), starts transmitting power according to the first power transmitting method (S1310, S1406). Details of the operations for transmitting power according to the first power transmitting method are the same as those described in the first embodiment, and descriptions thereof will be omitted. Note that the power transmission start notification and the response are not absolutely necessary sequences. In the case where the power receiving method response (S1307) indicates that the power receiving apparatus 30 is operating according to the second power receiving method ("second power receiving method" in S1404), the power transmitting apparatus 20 starts transmitting power according to the second power transmitting method (S1405). Details of the operations for transmitting power according to the second power transmitting method are the same as those described in the second embodiment, and descriptions thereof will be omitted.

In this manner, the power transmitting apparatus 20 according to the present embodiment switches between the power transmitting methods described in the first embodiment and the second embodiment based on a response from the power receiving apparatus 30. As a result, not only is it possible to prevent heat emission from non-power transmission targets, damage caused by power transmission, and so on, but it is also possible for a plurality of power receiving apparatuses having different power receiving methods to receive power. Furthermore, with the power receiving apparatus 30 according to the present embodiment, not only is it possible to prevent unnecessary power reception from unauthenticated devices and reduce the possibility of damage to the device, but it is also possible to receive power from power transmitting apparatuses operating both in a power transmitting method that corresponds to the power receiving method of the power receiving apparatus 30 and in a different power transmitting method. The foregoing has described the power transmitting apparatus 20 requesting the power receiving method from the power receiving apparatus 30 and determining the power receiving method according to the details of the response to that request. However, which power receiving method to use in the case where there is no response to the request for the power receiving method from the power transmitting apparatus 20 may be determined in advance, and the power receiving method may then be selected. For example, in the case where there is no response to the power receiving method request issued from the power transmitting apparatus 20 to the power receiving apparatus 30, "method 1" may be set between the power transmitting apparatus 20 and the power receiving apparatus 30. In this case, no response is returned in the case where the power receiving method of the power receiving apparatus 30 that has received the request for the power receiving method in the authentication sequence is "method 1". Because there is no response to the request for the power receiving method, the power transmitting apparatus 20 transmits power according to method 1. This corresponds to a case where the power receiving apparatus 30 wishes to receive power, and thus it is often the case that the power receiving apparatus 30 does not wish to use much power. This method contributes to a reduction in the wasteful consumption of power. The same applies to the case where "method 2" is set for cases where no response is made to the request for the power receiving method. Selecting a commonly-used method as the method used in the case where the power receiving apparatus 30 makes no response makes it possible to increase the power reduction effects in the power receiving apparatus 30.

Fourth Embodiment

The present embodiment will be described with reference to the drawings. A wireless power transmitting system according to the present embodiment is the same as the system illustrated in FIG. 1 and described in the first embodiment, and thus descriptions thereof will be omitted. The power transmitting apparatus 20 and the power receiving apparatus 30 according to the present embodiment differ from those described in the first embodiment and the second embodiment in terms of the power transmitting section 21 and the power receiving section 31. Furthermore, like the power transmitting apparatus 20 and the power receiving apparatus 30 according to the third embodiment, the power transmitting apparatus 20 according to the present embodiment is capable of switching between the first power transmitting method and the second power transmitting method. In other words, the internal configuration of the power transmitting apparatus 20 according to the present embodiment is a combination of the configurations shown in FIGS. 2 and 8, and thus descriptions thereof will be omitted. However, it is assumed that the power transmitting apparatus 20 according to the present embodiment includes a selection unit (not shown) for controlling whether to operate according to the first power transmitting method or the second power transmitting method. Furthermore, the power receiving apparatus 30 according to the present embodiment is capable of operating according to the first power receiving method and the second power receiving method. In other words, the internal configuration of the power receiving apparatus 30 according to the present embodiment is a combination of the configurations shown in FIGS. 3 and 9, and thus descriptions thereof will be omitted.

Figure 15:
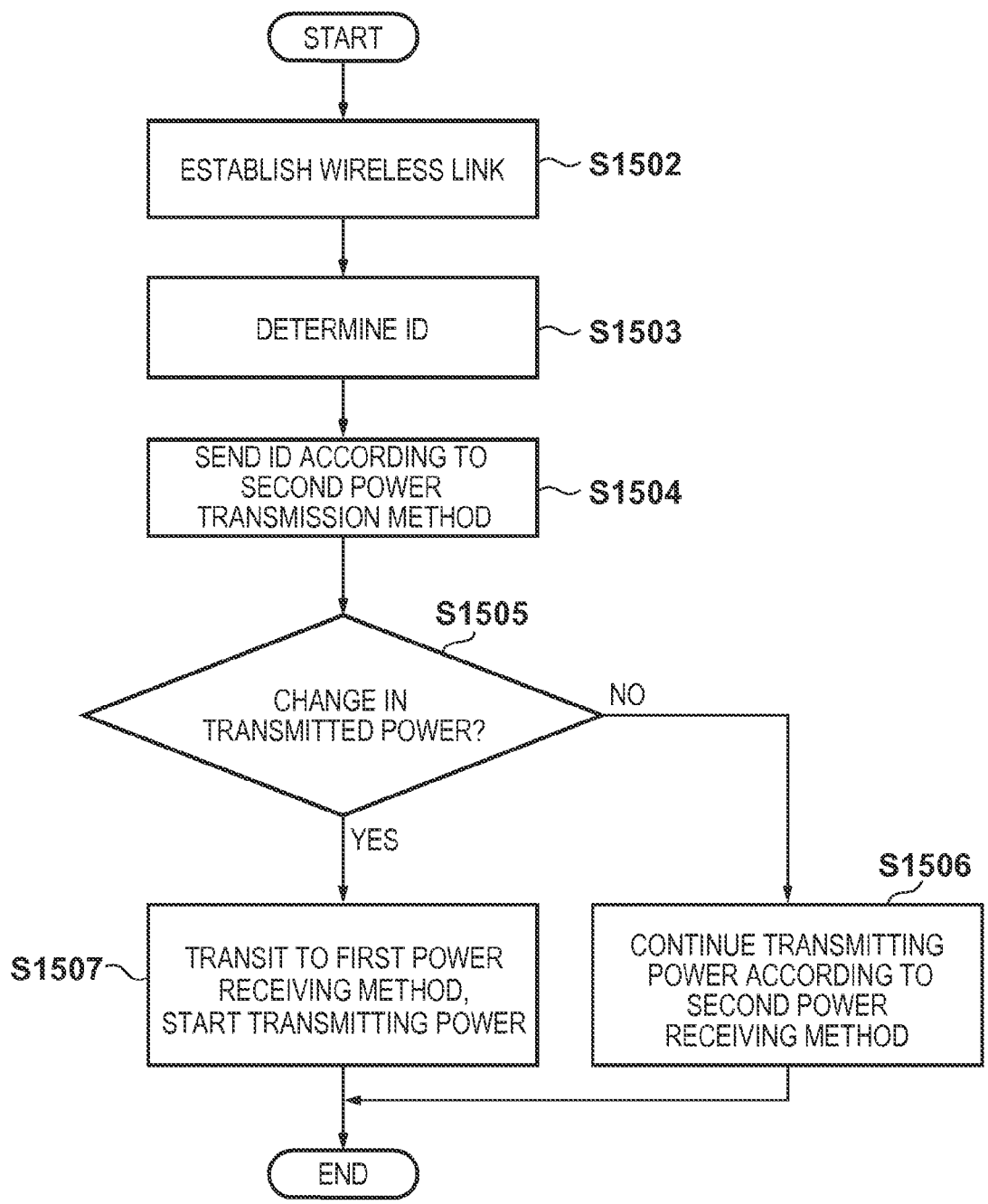
FIG. 15 is a flowchart illustrating operations performed by a power transmitting apparatus according to a fourth embodiment.

Next, operations performed by the power transmitting apparatus 20 will be described with reference to FIG. 15. FIG. 15 is a flowchart illustrating operations according to the present embodiment. The power transmitting apparatus 20 establishes a wireless link with the power receiving apparatus 30 (S1501), and determines an ID (S1502). Up to this point, the power transmitting apparatus 20 is not aware of the power receiving method used by the power receiving apparatus 30 (that is, the first power receiving method or the second power receiving method). The power transmitting apparatus 20 starts a procedure for transmitting power according to the second power transmitting method, using the ID determined in the authentication sequence (S1503). At this time, in the case where the power receiving apparatus 30 can operate according to the second power receiving method, the operations are the same as those described in the second embodiment, and the power receiving apparatus 30 can receive power (S1505).

On the other hand, in the case where the power receiving apparatus 30 is operating according to the first power receiving method, the power receiving apparatus 30 changes the impedance based on a predetermined ID for the power transmitted based on the ID, and thus a large disturbance occurs in the power transmitted by the power transmitting apparatus 20. In the case of such operations, the power transmitting apparatus 20 determines that the power receiving apparatus 30 is operating according to the first power receiving method; the power transmitting apparatus 20 then carries out intermittent transmission for ID detection according to the first power transmitting method, and enters the same power transmitting operations as those described in the first embodiment (S1506). Note that in the case where the power transmitting apparatus 20 has first carried out a procedure for transmitting power according to the first power transmitting method, the IDs are not exchanged in the case where the power receiving apparatus 30 is operating according to the second power receiving method, and thus the power transmitting procedure does not advance.

In this manner, the power transmitting apparatus 20 according to the present embodiment switches between the power transmitting methods described in the first embodiment and the second embodiment based on its own determination. As a result, in addition to preventing heat emission from non-power transmission targets, damage caused by power transmission, and so on, it is also possible for a plurality of power receiving apparatuses having different power receiving methods to receive power. Furthermore, with the power receiving apparatus 30 according to the present embodiment, not only is it possible to prevent unnecessary power reception from unauthenticated devices and reduce the possibility of damage to the device, but it is also possible to receive power from power transmitting apparatuses operating both in a power transmitting method that corresponds to the power receiving method of the power receiving apparatus 30 and in a different power transmitting method.

Other Embodiments

Embodiments of the present invention can also be realized by a computer of a system or apparatus that reads out and executes computer executable instructions recorded on a storage medium (e.g., non-transitory computer-readable storage medium) to perform the functions of the above-described embodiment of the present invention, and by a method performed by the computer of the system or apparatus by, for example, reading out and executing the computer executable instructions from the storage medium to perform the functions of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-088878, filed Apr. 19, 2013, Japanese Patent Application No. 2013-088879, filed Apr. 19, 2013, and Japanese Patent Application No. 2013-088881, filed Apr. 19, 2013, which are hereby incorporated by reference herein in their entirety.

The invention claimed is:

1. A power transmitting apparatus that transmits power to a power receiving apparatus, the power transmitting apparatus comprising:
a first power transmission unit configured to execute wireless power transmission intermittently using a first antenna;
a detection unit configured to detect a signal received from the power receiving apparatus in response to the power transmission by the first power transmission unit;
a second power transmission unit configured to execute, in the case where the signal has been detected by the detection unit, wireless power transmission having longer period than a period of the power transmission by the first power transmission unit using the first antenna;
a third power transmission unit configured to execute wireless power transmission having larger amount of power than amounts of power of the power transmission by the first power transmission unit and power of the power transmission by the second power transmission unit using the first antenna; and
a communication unit configured to execute, after the second power transmission unit executes the power transmission, communications with the power receiving apparatus to determine whether to cause the third power transmission unit to execute the power transmission using a second antenna different from the first antenna.

2. The power transmitting apparatus according to claim 1, further comprising:
a determination unit configured to determine whether or not an ID obtained from the signal matches a predetermined ID, and
wherein the communication unit executes the communications if the determination unit determines that the IDs match.

3. The power transmitting apparatus according to claim 2, further comprising:
a notification unit configured to provide an ID match notification to the power receiving apparatus in the case where the determination unit has determined that the IDs match.

4. The power transmitting apparatus according to claim 2, wherein the third power transmission unit starts the power transmission in the case where the determination unit has determined that the IDs match.

5. The power transmitting apparatus according to claim 1, wherein the communication unit communicates a value related to power received by the power receiving apparatus, and
wherein the power transmitting apparatus determines whether or not to cause the third power transmission unit to execute the power transmission based on the value.

6. The power transmitting apparatus according to claim 5, wherein the power transmitting apparatus determines to cause the third power transmission unit to execute the power transmission if the value is greater than or equal to a threshold.

7. The power transmitting apparatus according to claim 1, further comprising:
an obstacle detection unit configured to detect an obstacle between a storage unit configured to store an initial impedance and the power receiving apparatus, wherein in the case where an impedance when the signal is not detected by the detection unit differs from the initial impedance stored in the storage unit, the obstacle detection unit determines that an obstacle has been detected.

8. The power transmitting apparatus according to claim 7, further comprising:
a display unit configured to display an error message in the case where the obstacle has been detected by the obstacle detection unit.

9. The power transmitting apparatus according to claim 2, further comprising:
a display unit configured to display an error message in the case where the determination unit has determined that the IDs do not match.

10. The power transmitting apparatus according to claim 5, further comprising:
a display unit configured to perform a display prompting the power receiving apparatus to be moved in the case where the value obtained from the power received by the power receiving apparatus is lower than a threshold.

11. The power transmitting apparatus according to claim 2,
wherein the ID determined in advance is determined in device authentication carried out between the power transmitting apparatus and the power receiving apparatus.

12. The power transmitting apparatus according to claim 1, further comprising:
a change detection unit configured to detect a change in impedance; and
a control unit configured to control the power transmission by the first power transmission unit, the second power transmission unit or the third power transmission unit based on the change.

13. The power transmitting apparatus according to claim 12, wherein the control unit stops the power transmission by the first power transmission unit, the second power transmission unit or the third power transmission unit based on the change.

14. The power transmitting apparatus according to claim 1, wherein the communication unit communicates by the Bluetooth.

15. The power transmitting apparatus according to claim 1, wherein the signal is load modulated.

16. A power receiving apparatus that receives power from a power transmitting apparatus, the power receiving apparatus comprising:
a transmission unit configured to transmit, after wireless intermittent power transmission is detected, a signal to the power transmitting apparatus during the time that first wireless power transmission having longer period than a period of the wireless intermittent power transmission is executed;
a communication unit configured to execute, after the signal is transmitted by the transmission unit, communications to determine whether the power transmitting apparatus executes second wireless power transmission having larger amount of power than amounts of power of the intermittent power transmission and the first wireless power transmission using a first antenna; and
a power receiving unit configured to receive the second wireless power transmission from the power transmitting apparatus in response to the communications by the communication unit using a second antenna different from the first antenna.

17. The power receiving apparatus according to claim 16, wherein the communication unit transmits the signal including information shared with the power transmitting apparatus.

18. The power receiving apparatus according to claim 16, wherein the communication unit communicates a value related to power received by the power receiving apparatus.

19. The power receiving apparatus according to claim 16, further comprising:
a changing unit configured to change a receiving impedance value,
wherein in the case where the wireless intermittent power transmission has been received from the power transmitting apparatus after the changing unit has increased the receiving impedance, the changing unit reduces the receiving impedance.

20. The power receiving apparatus according to claim 19,
wherein in the case where an ID match notification has been received from the power transmitting apparatus after the changing unit has reduced the receiving impedance, the changing unit further reduced the receiving impedance.

21. A control method for a power transmitting apparatus that transmits power to a power receiving apparatus, the method comprising:
executing first wireless power transmission intermittently using a first antenna;
detecting a signal received from the power receiving apparatus in response to the first wireless power transmission;
executing, in the case where the signal has been detected, second wireless power transmission having longer period than a period of the first wireless power transmission using the first antenna;
executing third wireless power transmission having larger amount of power than amounts of power of the first wireless power transmission and the second wireless power transmission using the first antenna; and
executing, after the second wireless power transmission, communications with the power receiving apparatus to determine whether to execute the third wireless power transmission using a second antenna different from the first antenna.

22. A control method for a power receiving apparatus that receives power from a power transmitting apparatus, the method comprising:
transmitting, after wireless intermittent power transmission is detected, a signal to the power transmitting apparatus during the time that first wireless power transmission having longer period than a period of the wireless intermittent power transmission is executed;
executing, after the signal is transmitted, communications to determine whether the power transmitting apparatus executes second wireless power transmission having larger amount of power than amounts of power of the intermittent power transmission and the first wireless power transmission using a first antenna; and
receiving the second wireless power transmission from the power transmitting apparatus in response to the communications using a second antenna different from the first antenna.

23. A non-transitory computer-readable storage medium storing a program that causes a computer to:
execute first wireless power transmission intermittently using a first antenna;
detect signal received from a power receiving apparatus in response to the first wireless power transmission;

execute, in the case where the signal has been detected, second wireless power transmission having longer period than a period of the first wireless power transmission using the first antenna;

execute third wireless power transmission having larger amount of power than amounts of power of the first wireless power transmission and the second wireless power transmission using the first antenna; and execute, after the second wireless power transmission, communications with the power receiving apparatus to determine whether to execute the third wireless power transmission using a second antenna different from the first antenna.

24. A non-transitory computer-readable storage medium storing a program that causes a computer to execute:

transmit, after wireless intermittent power transmission is detected, a signal to a power transmitting apparatus during the time that first wireless power transmission having longer period than a period of the wireless intermittent power transmission is executed;

execute, after the signal is transmitted, communications to determine whether the power transmitting apparatus executes second wireless power transmission having larger amount of power than amounts of power of the intermittent power transmission and the first wireless power transmission using a first antenna; and receive the second wireless power transmission from the power transmitting apparatus in response to the communications using a second antenna different from the first antenna.

* * * * *